United States Patent
Beach et al.

(10) Patent No.: US 11,087,387 B2
(45) Date of Patent: Aug. 10, 2021

(54) VIRTUAL FACILITY PLATFORM

(71) Applicant: eBay Inc., San Jose, CA (US)

(72) Inventors: David Beach, Santa Cruz, CA (US); John Tapley, San Jose, CA (US)

(73) Assignee: eBay Inc., San Jose, CA (US)

( * ) Notice: Subject to any disclaimer, the term of this patent is extended or adjusted under 35 U.S.C. 154(b) by 34 days.

(21) Appl. No.: 16/410,290

(22) Filed: May 13, 2019

(65) Prior Publication Data
US 2019/0266659 A1    Aug. 29, 2019

Related U.S. Application Data

(63) Continuation of application No. 14/821,533, filed on Aug. 7, 2015, now Pat. No. 10,380,673.

(51) Int. Cl.
| | |
|---|---|
| *G06Q 30/00* | (2012.01) |
| *G06Q 30/06* | (2012.01) |
| *H04L 29/08* | (2006.01) |
| *G06F 16/9535* | (2019.01) |
| *G06F 3/01* | (2006.01) |

(52) U.S. Cl.
CPC ......... *G06Q 30/0641* (2013.01); *G06F 3/011* (2013.01); *G06F 16/9535* (2019.01); *H04L 67/02* (2013.01); *H04L 67/20* (2013.01)

(58) Field of Classification Search
CPC ...................................................... G06Q 30/00
See application file for complete search history.

(56) References Cited

U.S. PATENT DOCUMENTS

| | | | |
|---|---|---|---|
| 5,696,892 | A | 12/1997 | Redmann et al. |
| 6,026,376 | A | 2/2000 | Kenney |
| 7,529,690 | B2 | 5/2009 | Hadi |
| 8,136,038 | B2 | 3/2012 | Ross et al. |
| 8,396,744 | B2 | 3/2013 | Pradeep et al. |

(Continued)

FOREIGN PATENT DOCUMENTS

WO    2017/027254 A1    2/2017

OTHER PUBLICATIONS

NueCity Virtual Shopping App. Ingiegogo. <https://www.indiegogo.com/projects/nuecity-the-first-virtual-shopping-app#/> (Year: 2014).*

(Continued)

*Primary Examiner* — Abby J Flynn
(74) *Attorney, Agent, or Firm* — FIG. 1 Patents

(57) ABSTRACT

In various example embodiments, a system and method for dynamically generating virtual marketplace platforms are presented. The system receives a set of facility data, a set of selections for a set of user interaction objects, and a set of object placement selections. The set of user interaction objects includes a first subset and a second subset. The system generates a virtual facility comprising the facility data and the set of user interaction objects distributed based on the object placement selections. The system receives user data for a user interacting with the virtual facility and one or more objects of the first and second subset of user interaction objects, dynamically arranges the second subset of user interaction objects into a second arrangement, and causes presentation of the virtual facility and the set of user interaction objects to the user.

20 Claims, 9 Drawing Sheets

(56) References Cited

U.S. PATENT DOCUMENTS

| | | | |
|---|---|---|---|
| 10,380,673 B2 | 8/2019 | Beach et al. | |
| 2002/0080177 A1 | 6/2002 | Orbanes et al. | |
| 2003/0014423 A1 | 1/2003 | Chuah | |
| 2007/0192203 A1 | 8/2007 | Di | |
| 2009/0037291 A1 | 2/2009 | Dawson et al. | |
| 2009/0113314 A1* | 4/2009 | Dawson | G06F 3/011 |
| | | | 715/757 |
| 2010/0164956 A1* | 7/2010 | Hyndman | G06F 3/011 |
| | | | 345/427 |
| 2010/0198653 A1* | 8/2010 | Bromenshenkel | G06Q 30/06 |
| | | | 705/7.11 |
| 2010/0241525 A1* | 9/2010 | Aguera y Arcas | G06F 3/011 |
| | | | 705/26.1 |
| 2013/0317950 A1* | 11/2013 | Abraham | G06Q 30/06 |
| | | | 705/27.1 |
| 2014/0129393 A1* | 5/2014 | Soon-Shiong | G06Q 30/06 |
| | | | 705/27.2 |
| 2015/0097862 A1 | 4/2015 | Reisner-kollmann et al. | |
| 2015/0120422 A1 | 4/2015 | Deshpande et al. | |
| 2016/0025981 A1* | 1/2016 | Burns | G02B 27/0093 |
| | | | 345/156 |
| 2016/0093105 A1 | 3/2016 | Rimon et al. | |
| 2016/0371768 A1* | 12/2016 | Crow | G06Q 30/0643 |
| 2017/0038916 A1 | 2/2017 | Beach et al. | |

OTHER PUBLICATIONS

Franczek, Edward. "Virtual Stores Drive Real Sales." GreenBook Blog. Dec. 13, 2011 https://www.greenbook.org/mr/market-research-technology/virtual-stores-drive-real-sales/ (Year: 2011).*

Advanced Simulations, Interactive Services. Sep. 13, 2014 https://web.archive.org/web/20140913013810/http://www.advancedsimulations.com:80/en/main.html (Year: 2014).*

Advanced Simulations, Data Collection. Sep. 13, 2014 https://web.archive.org/web/20140913013810/http://www.advancedsimulations.com:80/en/main.html (Year: 2014).*

Applicant-Initiated Interview Summary received for U.S. Appl. No. 14/821,533, dated Jul. 20, 2018, 3 pages.

Applicant-Interview Summary received for U.S. Appl. No. 14/821,533, dated Oct. 25, 2018, 4 pages.

Applicant-Initiated Interview Summary received for U.S. Appl. No. 14/821,533, dated Apr. 19, 2018, 3 pages.

Final Office Action received for U.S. Appl. No. 14/821,533, dated Jun. 25, 2018, 33 pages.

Non-Final Office Action received for U.S. Appl. No. 14/821,533, dated Feb. 16, 2018, 36 pages.

Non-Final Office Action received for U.S. Appl. No. 14/821,533, dated Oct. 2, 2018, 41 pages.

Notice of Allowance received for U.S. Appl. No. 14/821,533, dated Apr. 1, 2019, 24 pages.

Response to Final Office Action filed on Jul. 30, 2018, for U.S. Appl. No. 14/821,533, dated Jun. 25, 2018, 21 pages.

Response to Non-Final Office Action filed on Jan. 2, 2019, for U.S. Appl. No. 14/821,533, dated Oct. 2, 2018, 18 pages.

Response to Non-Final Office Action filed on May 15, 2018, for U.S. Appl. No. 14/821,533 dated Feb. 16, 2018, 19 pages.

International Preliminary Report on Patentability received for PCT Patent Application No. PCT/US2016/045130, dated Feb. 22, 2018, 12 pages.

International Search Report received for PCT Application No. PCT/US2016/045130, dated Sep. 29, 2016, 2 pages.

Written Opinion received for Application No. PCT/US2016/045130, dated Sep. 29, 2016, 10 pages.

Zhang et al., "Virtual Display Design and Evaluation of Clothing: a Design Process Support System", Springer, Aug. 31, 2013, pp. 223-240.

* cited by examiner

VIRTUAL FACILITY PLATFORM

CLAIM OF PRIORITY

This application is a continuation of and claims priority to U.S. patent application Ser. No. 14/821,533, filed Aug. 7, 2015, entitled "Virtual Facility Platform", the entire disclosure of which is hereby incorporated by reference herein in its entirety.

TECHNICAL FIELD

Embodiments of the present disclosure relate generally to generating virtual representations of physical facilities and, more particularly, but not by way of limitation, to dynamically generating virtual representations of physical facilities and internal environments capable of dynamic manipulation by a user.

BACKGROUND

Conventionally, consumers have conventionally visited physical stores to purchase goods. Internet based electronic commerce enables consumers to make purchases without visiting physical stores. Video games and electronic commerce have resulted in the proliferation of three dimensional virtual worlds on the internet. These three dimensional virtual worlds offer varying degrees of complexity but many elements are static within the virtual world to define boundaries and interactions of users within the virtual environment. Similarly, often texture mapping or skins, which provide color, texture, and differing appearance to fixed structures, are fixed to structures within the virtual environment. The result are constructed virtual environments which contain immovable objects having a set of defined features. Further, dynamic manipulation of the virtual environment during an interaction session is often limited with regard to these structures or objects and their appearance.

BRIEF DESCRIPTION OF THE DRAWINGS

Various ones of the appended drawings merely illustrate example embodiments of the present disclosure and cannot be considered as limiting its scope.

Figure 1:
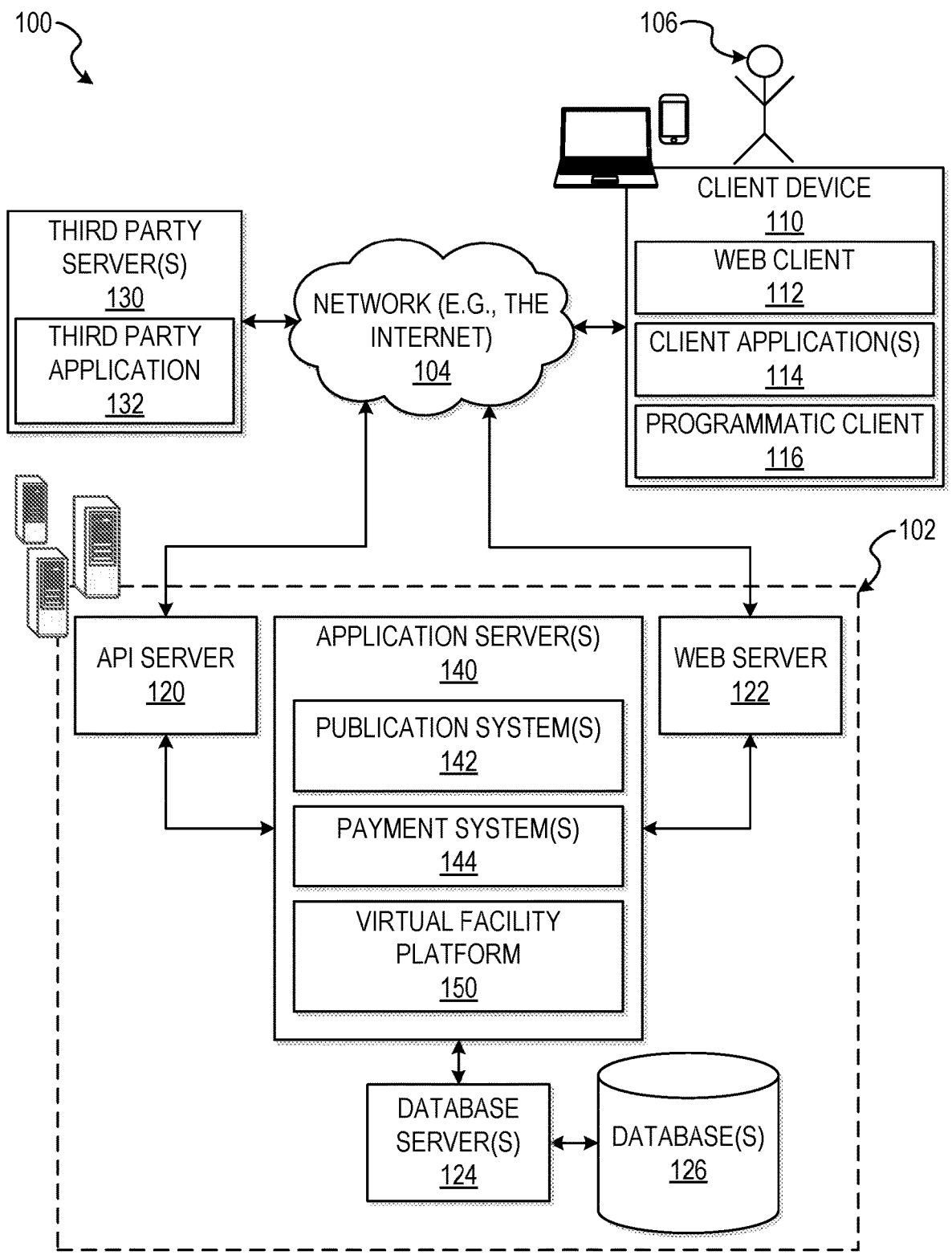
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In various example embodiments, methods and systems for virtual facility generation are presented. Virtual facilities are virtual representations of physical facilities. For example, a virtual facility may be a warehouse, a manufacturing plant, a house, an office building, a park, a shop, a mall, or any other structure to be represented and dynamically presented to a user with objects capable of being manipulated by a user. As representations of physical facilities virtual facilities include facility data representative of characteristics of the virtual facility. For example, facility data may include a three dimensional (3D) rendering of a physical facility, a facility template, image data representative of a physical facility, measurement data for a physical facility, physics data representative of physical properties and physical laws for inclusion in a virtual facility representing a physical facility.

As physical buildings may include objects such as furnishings, shelving, boxes, and the like, virtual facilities may include user interaction objects. In traditional 3D rendering of virtual landscapes, most items encountered such as shelves, rocks, trees, and the like were not capable of user manipulation. In the present disclosure, user interaction objects representing store items, shelving, home furnishings, wall decorations, and the like are generated by a virtual facility platform such that a user may be capable of interacting with these objects within a virtual facility. Further, in some embodiments, user interaction with a first object may cause the virtual facility platform to dynamically regenerate, modify, or otherwise adjust one or more of the remaining objects within the virtual facility. For example, when a user is shopping in a virtual facility representing an online store, when the user puts an item in the cart, such as a printer, the virtual facility platform modifies, replaces, or reorders the remaining objects within the store such that when the user avatar turns a related item, such as printer cartridges, are presented to the user in a placement previously occupied by another object.

The virtual facility platform receives facility data, selections for user interaction objects, and selections for object placement. Based on the data and selections, the virtual facility platform generates a virtual facility including the user interaction objects distributed based on the object placement selections. The virtual facility platform receives user data and dynamically arranges at least a portion of the user interaction objects based on the user data. The virtual facility platform then causes presentation of the virtual facility to the user.

The virtual facility platform may include an associated framework to provide virtual reality facilities (e.g., virtual facilities). In some instances, the virtual facility platform generates virtual facilities in the form of virtual storefronts providing users with a showroom experience. The showroom experience, in some instances, attempts to approximate the real world while still providing an information rich environment and experience of internet shopping for the user. In some embodiments, merchants provide a list of inventory to the virtual facility platform such that the virtual facility platform provides a virtual facility that includes the inventory. Further, merchants may be charged rates based on aspects of the virtual facility such as size, design, decor, number of user interaction objects, number of advertisements for products of other merchants, and other aspects which may affect one or more characteristic of displaying the virtual facility. Additionally, merchants may be allowed to charge third parties for advertising space within the virtual facility.

Previously generated virtual facilities, selected user interaction objects, and user interaction object placement may be stored in one or more databases or repositories. For example, a digital object repository may contain virtual representations (e.g., models) of real-world goods, some of which are representations of the selected user interaction objects. In some instances, models are used for generic goods (e.g., couch, cereal box, etc.) or specific goods. Where models are used, the digital object repository may also include one or more skins acting as an overlay of product information and branding.

In various example embodiments, the virtual facilities may be implemented on a network-based publication system and configured to enable virtual storefronts to transact for physical (i.e., real world) goods. For example, as a virtual storefront, the virtual facility may be generated with appropriate code and algorithms to receive queries and purchase requests indicative of a user attempting to purchase an item. The virtual facility may be linked, for example through an inventory system, to a physical location storing goods being purchased. After receiving an order and payment for the order, the virtual facility may contact the inventory system and cause decrement to a quantity of a product within the inventory system. Further, the virtual facility may cause the inventory system to issue a purchase order or request such that the order is fulfilled by collecting the product from physical storage and shipping the physical product to the user.

With reference to FIG. 1, an example embodiment of a high-level client-server-based network architecture 100 is shown. A networked system 102, in the example forms of a network-based marketplace or payment system, provides server-side functionality via a network 104 (e.g., the Internet or wide area network (WAN)) to one or more client devices 110. FIG. 1 illustrates, for example, a web client 112 (e.g., a browser, such as the Internet Explorer® browser developed by Microsoft® Corporation of Redmond, Wash. State), a client application 114, and a programmatic client 116 executing on client device 110.

The client device 110 may comprise, but is not limited to, a mobile phone, desktop computer, laptop, portable digital assistants (PDA), smart phone, tablet, ultra book, netbook, laptop, multi-processor system, microprocessor-based or programmable consumer electronics, game console, set-top boxe, or any other communication device that a user may utilize to access the networked system 102. In some embodiments, the client device 110 may comprise a display module (not shown) to display information (e.g., in the form of user interfaces). In further embodiments, the client device 110 may comprise one or more of a touch screens, accelerometers, gyroscopes, cameras, microphones, global positioning system (GPS) devices, and so forth. The client device 110 may be a device of a user that is used to perform a transaction involving digital items within the networked system 102. In one embodiment, the networked system 102 is a network-based marketplace that responds to requests for product listings, publishes publications comprising item listings of products available on the network-based marketplace, and manages payments for these marketplace transactions. One or more users 106 may be a person, a machine, or other means of interacting with client device 110. In embodiments, the user 106 is not part of the network architecture 100, but may interact with the network architecture 100 via client device 110 or another means. For example, one or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

Each of the client device 110 may include one or more applications (also referred to as "apps") such as, but not limited to, a web browser, messaging application, electronic mail (email) application, an e-commerce site application (also referred to as a marketplace application), and the like. In some embodiments, if the e-commerce site application is included in a given one of the client device 110, then this application is configured to locally provide the user interface and at least some functionalities with the application configured to communicate with the networked system 102, on an as needed basis, for data and/or processing capabilities not locally available (e.g., access to a database of items available for sale, to authenticate a user 106, to verify a method of payment, etc.). Conversely, if the e-commerce site application is not included in the client device 110, the client device 110 may use its web browser to access the e-commerce site (or a variant thereof) hosted on the networked system 102.

One or more users 106 may be a person, a machine, or other means of interacting with the client device 110. In example embodiments, the user 106 is not part of the network architecture 100, but may interact with the network architecture 100 via the client device 110 or other means. For instance, the user 106 provides input (e.g., touch screen input or alphanumeric input) to the client device 110 and the input is communicated to the networked system 102 via the network 104. In this instance, the networked system 102, in response to receiving the input from the user 106, communicates information to the client device 110 via the network 104 to be presented to the user 106. In this way, the user 106 can interact with the networked system 102 using the client device 110.

An application program interface (API) server 120 and a web server 122 are coupled to, and provide programmatic and web interfaces respectively to, one or more application servers 140. The application servers 140 may host one or more publication systems 142 and payment systems 144, each of which may comprise one or more modules or applications and each of which may be embodied as hardware, software, firmware, or any combination thereof. The application servers 140 are, in turn, shown to be coupled to one or more database servers 124 that facilitate access to one or more information storage repositories or database(s) 126.

In an example embodiment, the databases 126 are storage devices that store information to be posted (e.g., publications or listings) to the publication system 142. The databases 126 may also store digital item information in accordance with example embodiments.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more promotional, marketplace, or payment functions that are supported by the relevant applications of the networked system 102.

The publication systems 142 may provide a number of publication functions and services to users 106 that access the networked system 102. The payment systems 144 may likewise provide a number of functions to perform or facilitate payments and transactions. While the publication system 142 and payment system 144 are shown in FIG. 1 to both form part of the networked system 102, it will be appreciated that, in alternative embodiments, each system 142 and 144 may form part of a payment service that is separate and distinct from the networked system 102. In some embodiments, the payment systems 144 may form part of the publication system 142.

The virtual facility platform 150 may provide functionality operable to dynamically generate virtual facilities and direct users 106 through the virtual facilities in a three dimensionally rendered environment. For example, the virtual facility platform 150 receives facility data, a set of selections for a set of user interaction objects, and a set of object placement selections from a facility generation entity. A facility generation entity is an individual, team, or company whose facility is being generated or who is providing input in generating a virtual facility. For example, a facility generation entity may be a vendor generating a virtual storefront, a stadium operator generating a stadium venue. The virtual facility platform 150 may generate a virtual facility based on the data received and store the received data and generated facility in the database 126. The virtual facility platform 150 may access the generated facility based on user selections of the generated facility and objects within the generated facility. In some example embodiments, the virtual facility platform 150 may dynamically arrange sets of the objects within the generated facility based on user interactions with subsets of the sets of objects. As users 106 interact with the generated facility, the virtual facility platform 150 may refine the presentation and dynamic arrangements of subsets of objects based on user preferences and proclivities. In some example embodiments, the virtual facility platform 150 may communicate with the publication systems 142 (e.g., accessing item listings) and payment system 144 to enable purchases of objects within a generated facility, purchase of objects and models for facility generation, and other purposes. In an alternative embodiment, the virtual facility platform 150 may be a part of the publication system 142.

Further, while the client-server-based network architecture 100 shown in FIG. 1 employs a client-server architecture, the present inventive subject matter is, of course, not limited to such an architecture, and could equally well find application in a distributed, or peer-to-peer, architecture system, for example. The various publication system 142, payment system 144, and virtual facility platform 150 could also be implemented as standalone software programs, which do not necessarily have networking capabilities.

The web client 112 may access the various publication and payment systems 142 and 144 via the web interface supported by the web server 122. Similarly, the programmatic client 116 accesses the various services and functions provided by the publication and payment systems 142 and 144 via the programmatic interface provided by the API server 120. The programmatic client 116 may, for example, be a seller application (e.g., the Turbo Lister application developed by eBay® Inc., of San Jose, Calif.) to enable sellers to author and manage listings on the networked system 102 in an off-line manner, and to perform batch-mode communications between the programmatic client 116 and the networked system 102.

Additionally, a third party application(s) 132, executing on a third party server(s) 130, is shown as having programmatic access to the networked system 102 via the programmatic interface provided by the API server 120. For example, the third party application 132, utilizing information retrieved from the networked system 102, may support one or more features or functions on a website hosted by the third party. The third party website may, for example, provide one or more promotional, marketplace, or payment functions that are supported by the relevant applications of the networked system 102.

Figure 2:
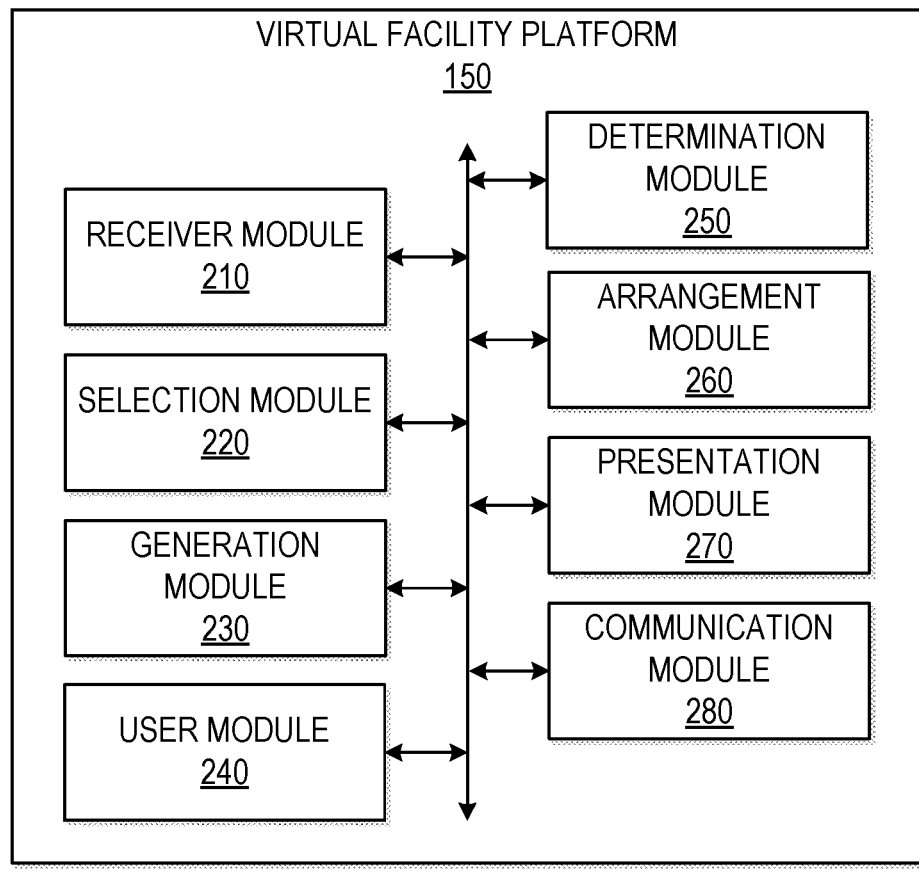
FIG. 2 is a block diagram of an example virtual facility platform, according to some example embodiments.

FIG. 2 is a block diagram illustrating components of the virtual facility platform 150, according to some example embodiments. The virtual facility platform 150 is shown as including a receiver module 210, a selection module 220, a generation module 230, a user module 240, a determination module 250, an arrangement module 260, a presentation module 270, and a communication module 280, all configured to communicate with one another (e.g., via a bus, shared memory, or a switch). Any one or more of the modules described herein may be implemented using hardware (e.g., at least one processor of a machine) or a combination of hardware and software. For example, any module described herein may configure a processor (e.g., among one or more processors of a machine) to perform operations for which that module is designed. Moreover, any two or more of these modules may be combined into a single module, and the functions described herein for a single module may be subdivided among multiple modules. Furthermore, according to various example embodiments, modules described herein as being implemented within a single machine, database(s) 126, or device (e.g., client device 110) may be distributed across multiple machines, database(s) 126, or devices.

The receiver module 210 receives various requests and selections from one or more devices, such as the client device 110. In various example embodiments, the receiver module 210 receives facility data and selections from a facility generation entity (e.g., a vendor generating a virtual storefront, a stadium operator generating a stadium venue, etc.) and requests from a user (e.g., the user 106) associated with the client device 110 attempting to access a facility for presentation in a virtual reality application. In some example embodiments, the receiver module 210 receives a set of facility data. As will be explained in more detail below, facility data may include a three dimensional (3D) rendering of a physical facility, a facility template, image data representative of a physical facility, measurement data for a physical facility, physics data representative of physical properties and physical laws for inclusion in a virtual facility representing a physical facility, and other suitable facility data or selections of facility data from a facility model repository.

The receiver module 210 may receive the facility data in a set of operations configured to generate and present virtual facility representations of a physical facility. In some instances, the receiver module 210 receives virtual facility selections. As will be explained in more detail below, the virtual facility selections may toggle or otherwise select among virtual facilities previously generated by the virtual facility platform 150. The receiver module 210 can be a hardware implemented module or hardware-software implemented module. An example embodiment of components of the receiver module 210 is described with respect to the module described below in the section entitled "Modules, Components, and Logic."

The selection module 220 receives various selections from one or more devices, such as the client device 110, to generate a virtual facility representing a physical facility. In various example embodiments, the selection module 220 receives selections of user interaction objects and object placement. The selection module 220 may receive the selections of user interaction objects from the facility generation entity and may receive the object placement selections from one or more of the facility generation entity, the user 106, and a third party entity. In some instances, one or more selections of the set of selections for the set of user interaction objects comprise an object selection and a texture selection. The object selection may comprise a selection of an object from an object repository and the texture selection may comprise a selection of a texture from a texture repository, where the texture is to be overlaid on the selected object. The selection module 220 can be a hardware implemented module or a hardware-software implemented module. An example embodiment of components of the selection module 220 is described with respect to the module described below in the section entitled "Modules, Components, and Logic."

The generation module 230 generates a virtual facility from the facility data received by the receiver module 210 and the selections of the user interaction objects and object placement received by the selection module 220. For example, generating a virtual facility may comprise coding, digitally rendering, or otherwise creating a digital representation of a physical facility in the form of the virtual facility. In some instances, generating the virtual facility creates or modifies one or more executable files capable of being executed to render or otherwise display the virtual facility on a client device of a user.

As will be explained in more detail below, the generation module 230 generates a model of the virtual facility based on the facility data, received from the facility generation entity or created by the virtual facility platform using selections from the facility generation entity, and distributes the set of user interaction objects within the virtual facility model using the set of object placement selections. In various example embodiments, the generation module 230 arranges the set of user interaction objects in a first arrangement, according to the object placement selections, by dynamically rearranged by the arrangement module 260. The generation module 230 may generate a set of virtual facilities (e.g., a plurality of virtual facilities) with differing distributions or arrangements of one or more of the set of user interaction objects and a set of facility objects included within the facility data. In some embodiments, facility objects are objects within a facility used for organizing and presenting user interaction objects. For example, the facility objects may be shelves of a store on which user interaction objects (e.g., dynamic representations of objects to be purchased) are arranged for presentation and access by the user. The set of virtual facilities may be generated to model redistribution or rearrangement of the set of user interaction objects and the set of facility objects after the initial generation of the virtual facility. The generation module 230 can be a hardware implemented module or a hardware-software implemented module. An example embodiment of components of the generation module 230 is described with respect to the module described below in the section entitled "Modules, Components, and Logic."

The user module 240 receives various requests, selections, characteristic data, history data, and profile data of a user 106 interacting with the virtual facility and the set of user interaction objects. The characteristic data of a user may be a representation of characteristics of the user such as demographic information, identity information, geographic location, income information, relationship status, and the like. The history data of a user includes purchase history, use history (e.g., data representative of previous interactions with one or more virtual facility or the network-based publication system 142), and other historical information associated with the user. The profile data of the user includes selected preferences, interests, connections to other users, and other information representative of the user. In various example embodiments, the user module 240 receives the characteristic data, history data, and profile data for the user 106 by accessing a database (e.g., the database 126 or a database associated with the third party server 130). In some instances, one or more of the characteristic data, history data, and profile data of the user 106 is associated with the user 106 and automatically received or accessed by the user module 240 upon authenticating user credentials (e.g., logging in) with one or more of the virtual facility platform 150 and the network-based publication system 142. The user module 240 can be a hardware implemented module or a hardware-software implemented. An example embodiment of components of the user module 240 is described with respect to the module described below in the section entitled "Modules, Components, and Logic."

The determination module 250 determines associations among subsets of the set of user interaction objects and history data associated with the user 106. In some example embodiments, the determination module 250 differentiates among portions of the characteristic data, history data, and profile data as applicable to differing portions of the set of user interaction objects, as will be explained in more detail below. By way of example, the determination module 250 may identify a set of purchased items within the history data associated with the user 106. The determination module 250 may associate one or more purchased items of the set of purchased items with one or more user interaction objects of the set of user interaction objects. The determination module 250 can be a hardware implemented module or a hardware-software implemented module. An example embodiment of components of the determination module 250 is described with respect to the module described below in the section entitled "Modules, Components, and Logic."

The arrangement module 260 dynamically arranges the set of user interaction objects within the virtual facility. In some example embodiments, the arrangement module 260 arranges one or more user interaction objects of the set of user interaction objects based on the user data received by the user module 240. In some instances, the dynamic arrangement performed by the arrangement module 260 is performed during an interaction session of the user 106 within the virtual facility in real time. When dynamic arrangement is performed in real time, the dynamic arrangement may be performed based on interactions of the user 106 with the virtual facility. For example, dynamic arrangement of one or more user interaction objects may be performed when an avatar of the user 106 moves within the virtual facility, diverting a viewable area away from the one or more user interaction objects being dynamically arranged. In other instances, dynamic arrangement is performed prior to or upon entrance of the avatar of the user 106 into the virtual facility (e.g., at login or upon loading the virtual facility and prior to display of the virtual facility at the client device 110). The arrangement module 260 can be a hardware implemented module or a hardware-software implemented module. An example embodiment of components of the arrangement module 260 is described with respect to the module described below in the section entitled "Modules, Components, and Logic."

The presentation module 270 causes presentation of the dynamically generated virtual facility based on arrangements generated by the arrangement module 260, according to some example embodiments. The presentation module 270 causes presentation of the virtual facility on the user interface of the client device 110. For example, the presentation module 270 can generate a set of user interface elements, screens, frames, or the like for presentation at the client device 110. In some embodiments, the presentation module 270 causes presentation of the virtual facility by transmitting data representative of the virtual facility to the client device 110. In some instances, the presentation module 270 is implemented within the publication system 142 in the context of a server serving the data representative of the virtual facility to the client device 110. The presentation module 270 can be a hardware implemented module or a hardware-software implemented module. An example embodiment of components of the presentation module 270 is described with respect to the module described below in the section entitled "Modules, Components, and Logic."

The communication module 280 enables communication between the client device 110, the virtual facility platform 150, the publication system 142, and the third party server 130. In some example embodiments, the communication module 280 can enable communication among the receiver module 210, the selection module 220, the generation module 230, the user module 240, the determination module 250, the arrangement module 260, and the presentation module 270. The communication module 280 can be a hardware-implemented module or a hardware-software implemented module, as described in more detail below. For example, the communication module 280 can include communication mechanisms such as an antenna, a transmitter, one or more busses, and other suitable communication mechanisms capable of enabling communication between the modules 210-270, the client device 110, the virtual facility platform 150, and the publication system 142. The communication module 280 can be a hardware-implemented module or a hardware-software implemented module. An example embodiment of components of the communication module 280 is described with respect to the module described below in the section entitled "Modules, Components, and Logic."

Figure 3:
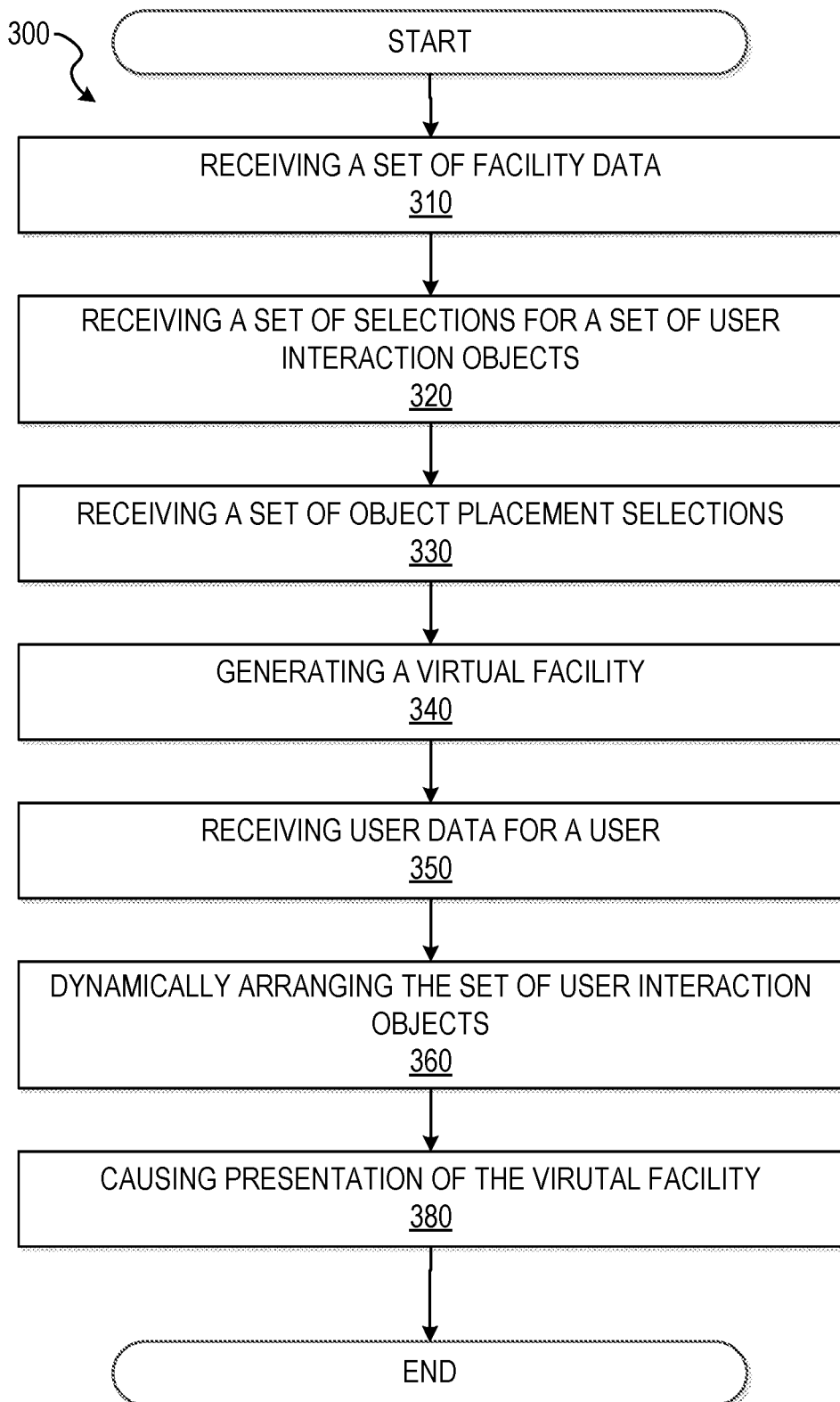
FIG. 3 is a flow diagram illustrating an example method, according to various embodiments.

FIG. 3 is a flow chart of operations of the virtual facility platform 150 in performing a method 300 of dynamically generating a virtual facility, according to some example embodiments. Operations in the method 300 may be performed by the virtual facility platform 150, using modules described above with respect to FIG. 2.

In operation 310, the receiver module 210 receives a set of facility data. In various example embodiments, the facility data comprises measurement data for a facility and image data for a facility. For example, the measurement data for the facility may be data representative of physical measurements of a physical facility. The measurement data may include orientation measurements (e.g., degree measurements for directions such as North, South, East, and West) and spatial facility measurements (e.g., measurements spanning the physical space within a physical facility). The measurement data may also include spatial interrelation measurements representing measurements between the aspects of the facility and facility objects positioned within the facility. The spatial interrelation measurements may also include measurements among the facility objects (e.g., measurements of the characteristics of the facility objects and relative positions of the facility objects). The receiver module 210 may receive the set of facility data from a client device 110 associated with the facility generation entity via the network 104, such as by receiving data representative of the set of facility data using the data link, transport, and session layers of the network 104. In some instances, the receiver module 210 cooperates with the communication module 280 to receive the set of facility data via the network 104 or any other suitable communication medium.

In various embodiments, the image data is used to form the facility objects for which measurement data was received. In some instances, the image data may be used as texture mapping data or may be used to render texture mapping data to be overlaid on the facility and the facility objects, where facility objects have been selected. The image data for the facility may take the form of one or more still image, video image, rendering, or other image data. For example, the image data may take the form of data representing one or more digital photograph, data representing video, data representing a rendered version of an image, or any other suitable image data.

In various other example embodiments, the set of facility data is selected from a set of facility templates. In these embodiments, the virtual facility platform 150 presents one or more templates for facilities or templates for portions of a facility which may be selected and combined to form a virtual facility. The receiver module 210 receives a set of selections representative of one or more facility templates or one or more facility portion templates. For example, a template facility may be a virtual facility which has been previously generated, with or without texture mapping and the facility portion templates may be a set of components of a virtual facility (e.g., walls, doors, ceiling, flooring, etc.). The set of facility templates may be stored in a template repository. In various example embodiments, the template repository may be implemented as data stored in a database (e.g., the database 126), a data table, or other suitable data structure.

In operation 320, the selection module 220 receives a set of selections for a set of user interaction objects. In various example embodiments, the set of user interaction objects comprises a first subset of user interaction objects and a second subset of user interaction objects. In at least some embodiments, the user interaction objects may be understood as models with one or more attachment points and a set of characteristics. For example, a model may be a collection of points in three dimensional space generated as a representation of an object. The one or more attachment points of the model may be a point on or in the model at which a texture map may be linked to the model for orienting the texture map to the model. The set of characteristics of the model are representations of physical characteristics, such as represented dimensions (e.g., length, width, height, weight). The set of characteristics may enable manipulation of the model by a user, using a physics engine of a computing system environment, in a manner similar to the physical world. In some instances, one or more selections for the set of user interaction objects comprises an object selection and a texture selection. The object selection selects an object from an object repository ad the texture selection selects a texture from a texture repository. The selected texture may then be overlaid on the selected object. The selection module 220 may receive the set of selections for the set of user interaction objects via the network 104, or other suitable communications medium, in cooperation with the communications module 280.

The user interaction objects may be stock models and divided into categories, where stock models within a category may be differentiated using texture mapping to overlay skins, skews, or other specific object representations. For example, a user interaction object may be a box with characteristics of length, width, height, and simulated weight and physics properties. The characteristics of the box may represent a generic cereal box shape. A texture selection may include texture mapping data to differentiate the generic cereal box shape among differing brands of cereal within a virtual facility (e.g., a virtual store).

In operation 330, the selection module 220 receives a set of object placement selections. The set of object placement selections may be received from a database, a client device of a user via an API server or Web server, or from third party servers. In various embodiments, the set of object placement selections represent a first arrangement of the set of user interaction objects. For example, where the set of user interaction objects comprise the first subset of user interaction objects and the second subset of user interaction objects, the set of object placement selections represents a first arrangement of the first subset of user interaction objects and a first arrangement of the second subset of user interaction objects. By way of further example, the set of object placement selections may represent placement of objects in a linear orientation (e.g., lined on a shelf of a store), a non-linear orientation (e.g., a winding maze, interweaving aisles), a puzzle (e.g., obfuscating a position of one or more of the user interaction objects and placing clue user interaction objects revealing the obfuscated position), and other orientations representing physical arrangements as well as tasks, objectives, games, and the like.

In various example embodiments, the set of object placement selections are performed by selecting, placing, or otherwise indicating a set of locations within the set of facility data. For example, the set of object placement selections may comprise placing the set of user interaction objects within a generated virtual facility. In this example, the facility generation entity may select a user interaction object and place the user interaction object in a position in space within a virtual facility which has already been generated. The placement of the user interaction object may cause one or more of the generation module 230 and the determination module 250 to identify coordinate or other position expression data representative of the placement and associate the position expression data with the user interaction object. By way of further example, the set of object placement selections may comprise indicating placement of the set of user interaction objects by coordinates, or other suitable location measurement or indicator, and storing the set of object placement selections within the set of facility data, such that the virtual facility may be generated based on processing of a single data set. The selection module 220 may receive the set of object placement selections via the network 104, or other suitable communication medium, in cooperation with the communication module 280.

In operation 340, the generation module 230 generates a virtual facility. The generated virtual facility may be in the form of one or more executable files generated and then stored on a database (e.g., database 126) or a portion of program code to be included in another executable file. In various example embodiments, the generated virtual facility comprises the facility data, received in operation 310, and the set of user interaction objects, received in operation 320, distributed within the virtual facility based on the set of object placement selections, received in operation 330. In some instances, the virtual facility is generated to match a physical facility associated with the user data, as described below. In these embodiments, the arrangement and disposition of user interaction objects may match a physical arrangement of physical objects within the physical facility. In various example embodiments, the generation module 230 may generate the virtual facility using polygonal modeling, curve modeling, digital sculpting (e.g., displacement, volumetric, dynamic tessellation, etc.), constructive solid geometry, implicit surfaces, subdivision surfaces, combinations thereof, or other suitable 3D modeling techniques.

Once generated and presented, the virtual facility may resemble a physical facility and the set of user interaction objects may be movable by an avatar of a user 106. Further, the set of user interaction objects may be rearranged by one or more module of the virtual facility platform 150. In some example embodiments, characteristics (e.g., position and texture mapping) of the set of user interaction objects may be stored in an object data structure referenced by the virtual facility. In these embodiments, rearrangements of the set of user interaction objects may be performed by modifying one or more characteristics in the object data structure. Further manipulation of one or more user interaction objects of the set of user interaction objects, performed by the avatar of the user 106, may cause a temporary change in a position and/or orientation value within the object data structure, such that during the interaction session, a moved object remains in a position to which the avatar moved the object. As will be explained in more detail below, once selected for movement by the avatar, the moved object may be excluded from rearrangement by the virtual facility platform 150 until the moved object has been replaced in its original position, or an available arrangement position.

In operation 350, the user module 240 receives user data for a user 106. In various example embodiments, the user module 240 receives the user data of the user 106 interacting with the virtual facility in an interaction session. In some instances, the user module 240 receives the user data of the user 106 prior to interaction with the virtual facility. For example, the user module 240 may receive the user data at initiation of the interaction session (e.g., loading of the virtual facility) or prior to the initiation of the interaction session (e.g., at login to the network-based publication system 142 or the virtual facility platform 150). The user module 240 may receive the user data via the network 104, or any other suitable communication medium, in cooperation with the communication module 280.

The user data may be understood as a combination of data associated with the user 106 indicating one or more of a user characteristic, a preference, a purchase history, an effective marketing style, a user profile, or other suitable data. In some example embodiments, the user data comprises location data to indicate a location of the user 106 within the physical world (e.g., country, city, GPS coordinates, etc.). In some instances, the user data comprises search query data for the user 106, purchased item data for the user 106, a user avatar and a relative position of the user 106 within the virtual facility. Where the user data comprises, at least in part, location data, the generated virtual facility may be generated to match a physical facility associated with the location of the user 106. In some embodiments, matching the virtual facility to the physical facility may not be an exact match, but include near matches, estimations, approximations, and the like.

In operation 360, the arrangement module 260 dynamically arranges the set of user interaction objects based on the user data. In various example embodiments, where the set of user interaction objects comprises the first subset of user interaction objects and the second subset of user interaction objects, the arrangement module 260 dynamically arranges the second subset of user interaction objects into a second arrangement. The dynamic arrangement of the set of user interaction objects may be performed during an interaction session or prior to initiation of an interaction session.

In various example embodiments, where the dynamic arrangement is performed prior to an interaction session, the arrangement module 260 dynamically arranges at least a portion of the set of user interaction objects prior to or upon entrance of the avatar of the user 106 into the virtual facility. For example, the arrangement module 260 may be prompted to dynamically arrange the set of user interaction objects when the receiver module 210 receives login credentials for the user 106 and passes the user data to the arrangement module 260. The user data provided for dynamic arrangement prior to the interaction session may comprise user data gathered prior to the interaction session. For example, the user data may comprise search query data, user profile data (e.g., demographic information, location information, preference information, etc.), purchase history data, internet search history data, and other user data able to be gathered and associated with the user 106 prior to initiating the interaction session.

As an example of dynamic arrangement based on the user data prior to initiation of the interaction session, where the user data includes search query data, at least a portion of the set of user interaction objects (e.g., the second subset of interaction objects) may be dynamically arranged based on the search query data. By way of further example, where the virtual facility is a store front and the second subset of interaction objects comprises one or more advertisement material (e.g., brands, slogans, ad banners, etc.), the second subset of interaction objects may be dynamically arranged such that advertisement material which matches one or more aspects of the user 106's search query data may be dynamically positioned proximate to the avatar of the user 106 as the avatar progresses through the virtual storefront. Here, the search query data may be understood as a search query or browsing history of the user 106 (e.g., internet history, search history, user profile history, etc.) The match between the advertisement material and the search query data may be an exact match or may contains a semantic relation (e.g., determined by fuzzy logic) or may be otherwise related to or associated with one or more aspects of the user 106's search query data. In some instances, the dynamic arrangement may perform a hybrid approach to dynamically arranging the set of user interaction objects. For example, by receiving subsequent search query data for the user 106 and periodically performing additional dynamic arrangement of the set of user interaction objects based on receipt of the subsequent search query data.

In some embodiments, where the dynamic arrangement is performed in real time and during the interaction session, the arrangement module 260 dynamically arranges at least a portion of the set of user interaction objects based on the user data. In these embodiments, the user data may contain historical user data and present user data. The historical user data may comprise search query data, user profile data (e.g., demographic information, location information, preference information, etc.), purchase history data, internet search history data, and other suitable user data. The present user data may comprise interaction data associated with the user 106. For example, the user interaction data may comprise relative position data (e.g., data representing the relative position of the user avatar within the virtual facility or proximate to the virtual facility), user interactions with the set of user interaction objects or facility objects, user orientation data (e.g., direction of view within the virtual facility, elevation, movement speed, etc.).

When dynamically arranging in real time, the arrangement module 260 may receive the historical user data and perform an initial dynamic arrangement. Upon receiving present user data indicating an interaction or movement within or proximate to the virtual facility, the arrangement module 260 may perform a subsequent dynamic arrangement of at least a portion of the set of user interaction objects. For example, the arrangement module 260 may perform dynamic arrangement of user interaction objects outside of a field of view of the avatar in anticipation of the user 106 moving the avatar into position to view the user interaction objects. By way of further example, the arrangement module 260 may dynamically arrange user interaction objects behind the avatar while the user 106 is controlling the avatar to turn around, such that each time the avatar has rotated 180°, the user 106 is presented with a new arrangement of the user interaction objects or different user interaction objects. Further, the arrangement module 260 may dynamically arrange user interaction objects at differing elevation levels within the virtual facility or around a corner of the virtual facility such that when the avatar jumps or rounds a corner, the user 106 is presented with user interaction objects based on the search history, preferences, or purchase history of the user 106 as well as the location of the avatar within the virtual facility.

A dynamic arrangement may be achieved by parsing the user data to determine one or more user interaction objects which are associated with the user data. For example, the user data is parsed for one or more keywords determined from the user 106's search history, product purchase history, or profile data. The one or more keywords are compared to the second subset of user interaction objects. The arrangement module 260, alone or in combination with one or more of the user module 240 or the determination module 250, determines a similarity or match among the one or more keywords and one or more user interaction objects of the second subset of user interaction objects. For example, the determination module 250 may parse one or more keywords contained within the description of or organizational hierarchy (e.g., category organization) of the second subset of user interaction objects, and match a keyword from the user data to a keyword of an identified user interaction object of the second subset of user interaction objects. For example, the determination module 250 may match keywords using approximate string matching techniques, Levenshtein distance, proximity searching, Aho-Corasick algorithm, semantic comparisons, or other suitable matching processes. After determining the identified user interaction object, the arrangement module 260 may modify position data associated with the identified user interaction object such that the identified user interaction object is placed proximate to a user avatar interacting with the virtual facility. For example, the arrangement module 260 can identify a proximate user interaction object of the first subset of user interaction objects and exchange first position data of the proximate user interaction object with second position data of the identified user interaction object. The identified user interaction object may then be rendered in the place of the proximate user interaction object.

In some example embodiments, the arrangement module 260 may perform the dynamic arrangement using similarity scores, generated as an approximation of a similarity between the user data (e.g., one or more keywords) and user interaction objects of the second subset of user interaction objects. For example, The arrangement module 260 may thereby arrange the second subset of user interaction objects, replacing their position data with position data of one or more of the first subset of user interaction objects. In some instances, the user interaction objects of the second subset of user interaction objects may be placed in an arrangement such that a user interaction object with a relatively higher similarity score will be placed closer or in a more prominent position (e.g., near eye level) to the user avatar, with other user interaction objects being placed farther away from the user avatar based on their respective similarity scores.

In operation 380, the presentation module 270 causes presentation of the virtual facility and the set of user interaction objects at a client device (e.g., the client device 110). As shown in FIG. 3, the set of user interaction objects is presented with the first subset of user interaction objects distributed in the first arrangement and the second subset of user interaction objects distributed in the second arrangement. In various example embodiments, the presentation module 270 causes presentation by transmitting data representative of the virtual facility and the arrangement of the set of user interaction objects to the client device 110. The transmission may be performed after a request for provision of the virtual facility (e.g., logging into the network-based publication system 142, selecting a user interface element for the virtual facility, etc.). In some instances, the transmission includes one or more system interrupts causing the client device 110 to temporarily or permanently cease or interrupt one or more processes to process and present the virtual facility and the set of user interaction objects in the dynamic arrangement generated by the arrangement module 260. The presentation module 270 may transmit the data representative of the virtual facility via the network 104, or any suitable communication mechanism, in cooperation with the communication module 280.

Figure 4:
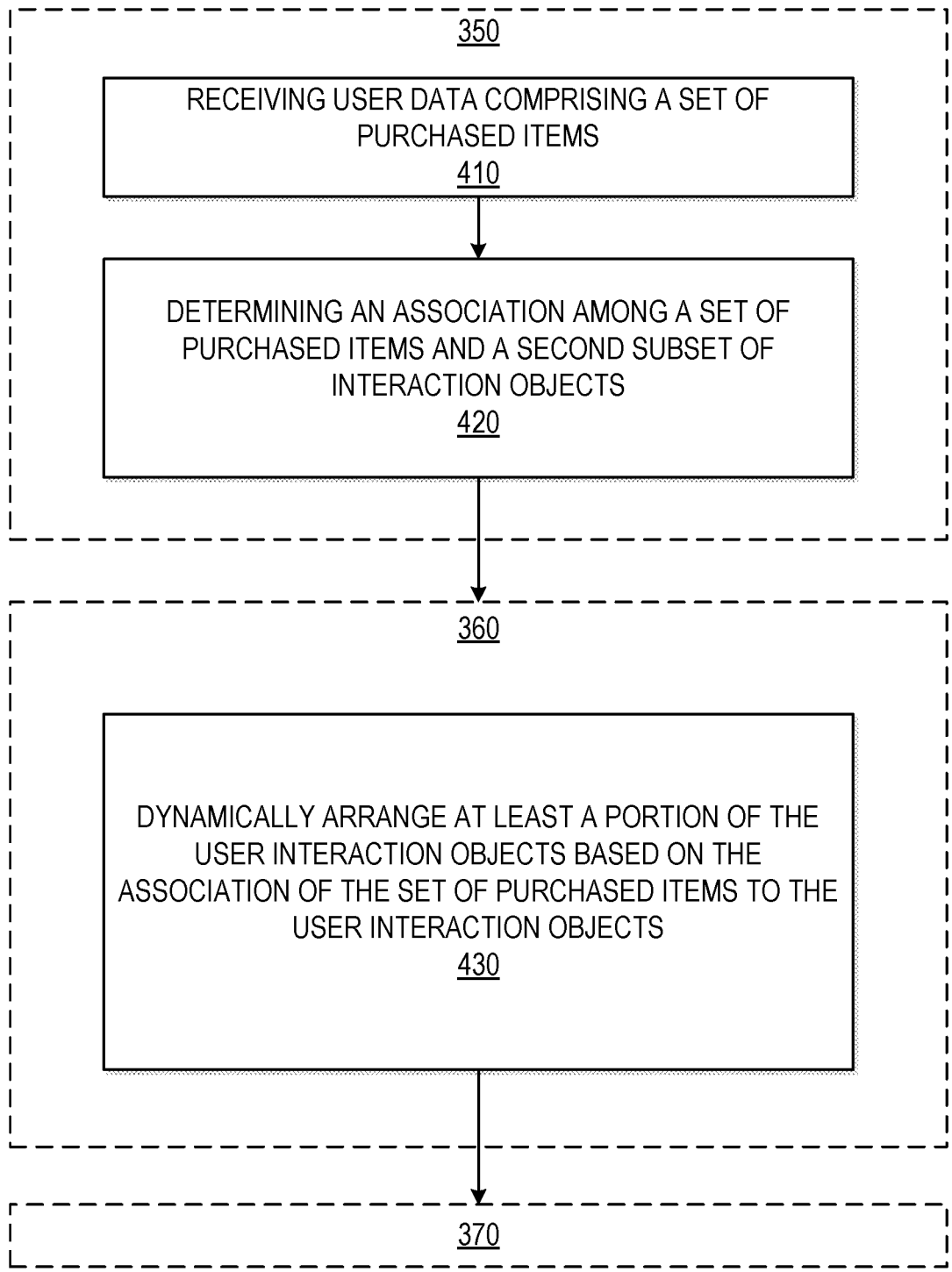
FIG. 4 is a flow diagram illustrating an example method, according to various embodiments.

FIG. 4 is a flow chart of operations of the virtual facility platform 150 in performing the operations 350 and 360 for generating a virtual facility and dynamically arranging the set of user interaction objects within the virtual facility, according to various example embodiments. The operations depicted in FIG. 4 may be performed by the virtual facility platform 150, using modules described above with respect to FIG. 2.

In operation 410, the user module 240 receives user data comprising a set of purchased items for the user 106. The set of purchased items represent items purchased by the user 106 or for the user 106. In some example embodiments, the set of purchased items are associated with the user profile, and portions of data indicative of the set of purchased items are stored within the user profile, metadata associated with the user profile, or metadata associated with the user 106. In some instances, the user module 240 receives the set of purchased items for the user 106 as a response to a request of the network-based publication system 142 or the third party server 130. In some instances, the user module 240 receives the user data at or before initiation of an interaction session. In some example embodiments, the user module 240 receives the set of purchased items during an interaction session or may receive the set of purchased items as a set of items of interest (e.g., items placed in a virtual shopping cart during an interaction session).

In operation 420, the determination module 250 determines an association among the set of purchased items and one or more user interaction objects of the set of user interaction objects. As shown in FIG. 4, the determination module 250 determines the association among the set of purchased items and the second subset of user interaction objects. In various example embodiments, the determination module 250 determines the association based on a comparison of data representing the set of user interaction objects and the set of purchased items. For example, the determination module 250 may compare textual data representative of a description of one or more aspects or characteristics. The aspects or characteristics of the user interaction objects and the purchased items may comprise one or more of a category, an item description (e.g., physical descriptions of an item, price description of an item, availability of an item, an item number, a stock keeping unit (SKU), etc.), a vendor associated with the item or from whom the item was purchased or may be purchased, and other information suitable to describe one or more aspects or characteristics of the item.

In some example embodiments, the determination module 250 determines the association based on matching keywords within the description of the user interaction objects and the set of purchased items. The determination module 250 may determine an association based on an exact match of one or more keywords. The determination module 250 may also determine an association based on a semantic or other relationship among the keywords within the descriptions of the set of user interaction objects and the set of purchased items. For example, the determination module 250 may use fuzzy logic or semantic analysis of the descriptions to determine matches which are related but not exact. In various instances, the determination module 250 determines the association based on matching non-textual descriptive data of the set of user interaction objects and the set of purchased items. For example, the determination module 250 may determine an association based on an exact match or relation of category or item numbers, SKU information, barcode representations, and other non-textual descriptive information.

In operation 430, the arrangement module 260 dynamically arranges at least a portion of the one or more user interaction objects (e.g., the second subset of user interaction objects) based on the association of the set of purchased items to the one or more user interaction objects. For example, where the first subset of user interaction objects is arranged in a first arrangement and the second subset of user interaction objects have been previously dynamically arranged into the second arrangement, the arrangement module 260, in operation 430, may dynamically arrange the second subset of user interaction objects into a third arrangement. By way of further example, the arrangement module 260 may dynamically arrange the second subset of user interaction objects into the second arrangement based on the user data within the user profile, indicating preferences of the user 106. Upon selection of and entrance into a virtual facility of a set of generated virtual facilities (e.g., entering a first virtual storefront within a virtual mall having a plurality of virtual storefronts), the arrangement module 260 may dynamically arrange at least a portion of the second subset of user interaction objects, within the entered virtual facility, into a third arrangement based on the set of purchased items associated with the user 106.

Further, in some example embodiments, the arrangement module 260 may select which of the set of user interaction objects to arrange or distribute within certain areas of the virtual facility based on a combination of the user interaction objects located within that area (e.g., an entertainment or electronics section of a virtual storefront) and the set of purchased items. For example, the set of user interaction objects in the virtual storefront may include virtual representations of movies, computer products and accessories (e.g., laptops, laptop cases, tablets, and tablet cases), and telecommunications products and accessories (e.g., mobile phones, smart phones, cases for mobile and smart phones, etc.). Where the avatar of the user 106 is located in a relative position within the virtual facility proximate to the computer products and accessories and the set of purchased items includes a 15 inch (38.1 cm) laptop, a portion of the user interaction objects representing cases and accessories associated with a 15 inch laptop may be dynamically arranged proximate to the avatar of the user (e.g., placed in a prominent virtual end cap display).

In some embodiments, the arrangement module 260 may receive as input the set of purchased items of the user (e.g., purchase history) and the set of user interaction objects proximate to the user avatar. For example, the arrangement module 260 may receive item numbers for the set of purchased items and the set of user interaction objects within twenty feet of the user avatar or within the same section of products in which the avatar is currently located. The arrangement module 260 may perform a lookup or database query of a database (e.g., database 126) containing items by item numbers and containing relationships among the items, such as related purchases, related components, and other relationships capable of being represented in a relational database. The database query is formulated to generate a result set including items of the set of user interaction objects which may be commonly purchased with, are related to, or are components of one or more of the set of purchased items. The arrangement module 260 receives the result set identifying which of the set of user interaction objects is related to the set of purchased items, and selects one or more of the set of user interaction objects within the result set. The arrangement module 260 then determines a line of sight for the avatar such that the line of sight represents user interaction object placements which would be displayed to the avatar during a 360° turn. The arrangement module 260 then outputs a first new position for the selected one or more user interaction objects such that the selected one or more user interaction objects is positioned in line of sight for the avatar upon presentation to the user 106. The arrangement module 260 also outputs a second new position for one or more user interaction object previously located in the first new position. For example, the arrangement module 260 may switch the placement of two user interaction objects to place the selected user interaction object in line of sight for the avatar and the non-selected user interaction object out of line of sight.

Once the dynamic arrangement has been performed by the arrangement module 260, the arranged user interface objects may be presented to the user 106 in an operation similar to or the same as the operation 370.

Figure 5:
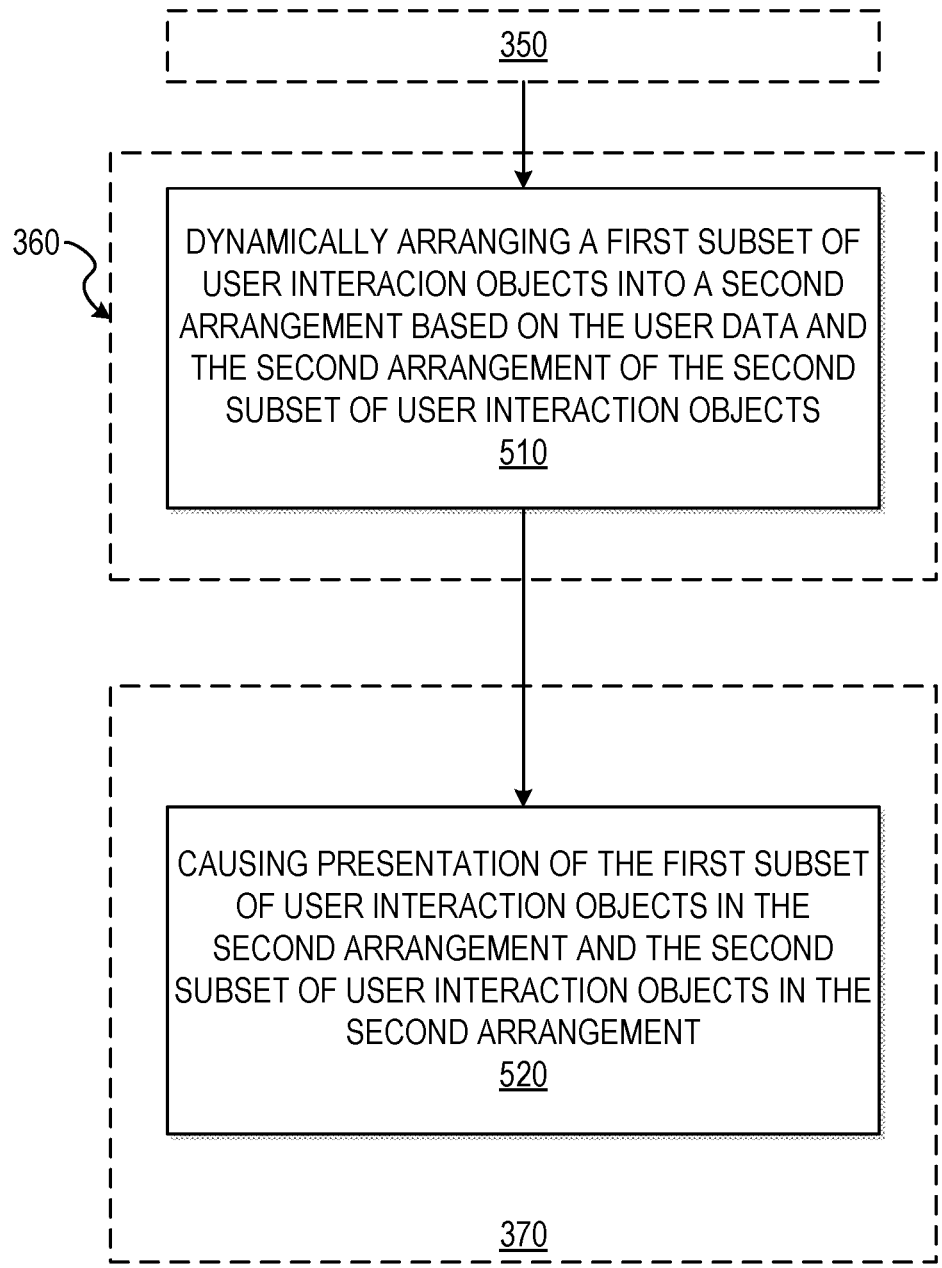
FIG. 5 is a flow diagram illustrating an example method, according to various embodiments.

FIG. 5 is a flow chart of operations of the virtual facility platform 150 in performing the operations 360 and 370 for generating a virtual facility and dynamically arranging the set of user interaction objects within the virtual facility, according to various example embodiments. The operations depicted in FIG. 5 may be performed by the virtual facility platform 150, using modules described above with respect to FIG. 2.

As shown in FIG. 5, the set of user interaction objects is divided among a first subset of user interaction objects and a second subset of user interaction objects. As discussed above, the first subset of user interaction objects is arranged in the first arrangement. In operation 510, the arrangement module 260 dynamically arranges the first subset of user interaction objects into a second arrangement based on the user data and the second arrangement of the second subset of user interaction objects. For example, the set of user interaction objects may be representations of products in a virtual store and one or more user interaction object of the first subset of user interaction objects is commonly purchased with one or more user interaction objects of the second subset of user interaction objects but located in a portion of the virtual store remote from the user avatar. Upon dynamically arranging one or more user interaction object of the second set of user interaction objects into the second arrangement, and the user avatar selecting a user interaction object of the second subset of user interaction objects, the arrangement module 260 may dynamically arrange the one or more user interaction objects of the first subset of user interaction objects into a second arrangement proximate to the second subset of user interaction objects.

In operation 520, the presentation module 270 causes presentation of the virtual facility and the set of user interaction objects at the client device 110, similar to operation 370. In operation 520, as shown in FIG. 5, the set of user interaction objects is presented with the first subset of user interaction objects in the second arrangement and the second subset of user interaction objects in the second arrangement.

For example, the user avatar may be positioned within a section of the virtual store having product representations of home appliances such as a coffee maker (e.g., the second subset of user interaction objects). The user avatar selects a coffee maker and places the coffee maker into the shopping cart (e.g., initiating an order for a coffee maker from a vendor associated with the virtual store) and begins to move to another location within the virtual store. The arrangement module 260 may dynamically arrange one or more representations of coffee ground canisters (e.g., user interaction objects of the first subset of user interaction objects) proximate to the coffee maker, such that when the user avatar turns to proceed to a different location in the virtual store, the user avatar is confronted by the representations of coffee ground canisters in a prominent display location near the coffee makers.

Figure 6:
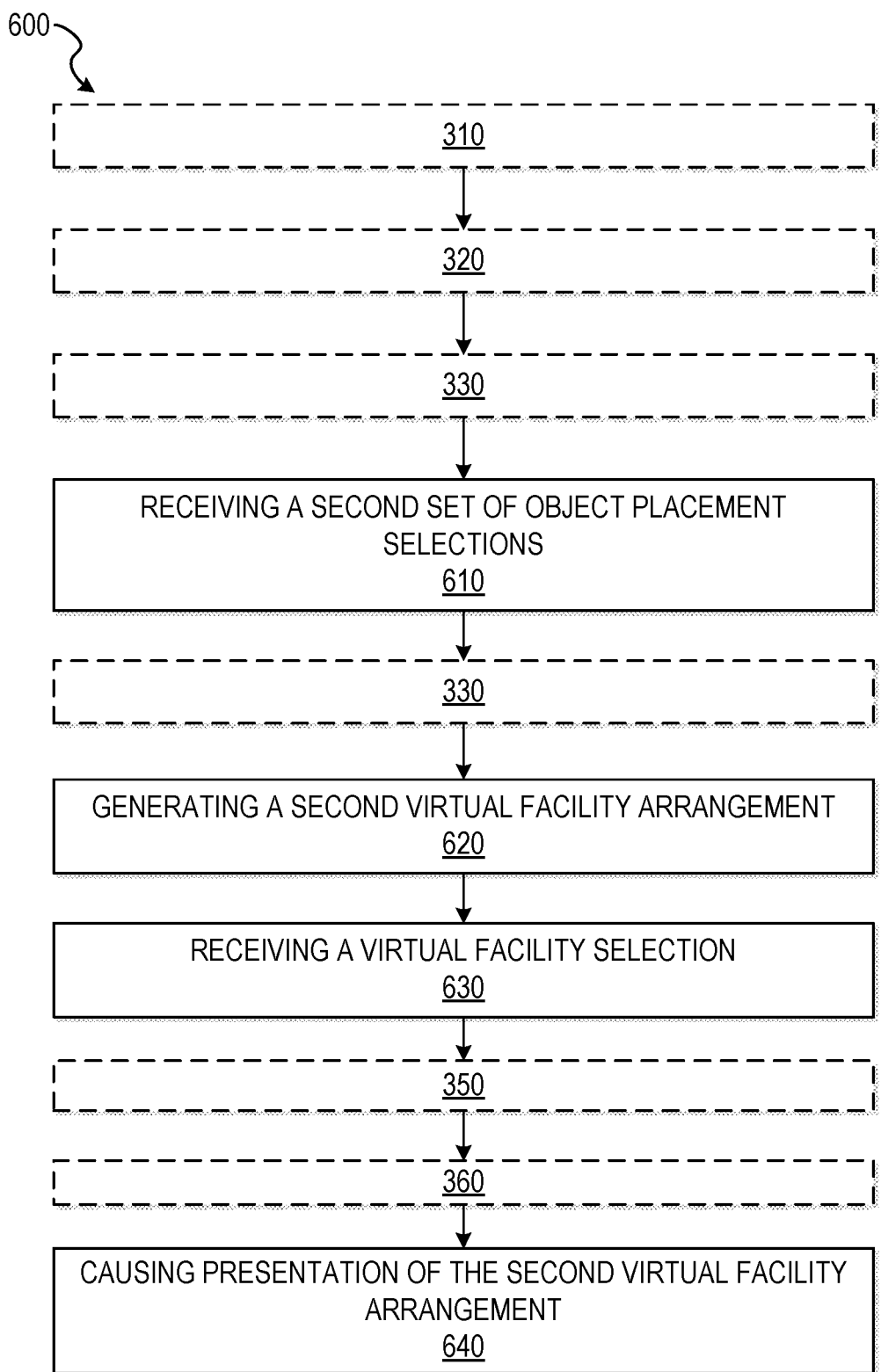
FIG. 6 is a flow diagram illustrating an example method, according to various embodiments.

FIG. 6 is a flow chart of operations of the virtual facility platform 150 in performing the method 600 for generating a virtual facility and a plurality of dynamically arrangements for the virtual facility and the set of user interaction objects within the virtual facility, according to various example embodiments. The operations depicted in FIG. 6 may be performed by the virtual facility platform 150, using modules described above with respect to FIG. 2 and may include one or more of the operations presented for the method 300.

As shown in FIG. 6, the virtual facility may be generated and, in at least some embodiments, dynamically arranged such that the first subset of user interaction objects is arranged according to the first arrangement and the second subset of user interaction objects is arranged according to the second arrangement. In this respect, the virtual facility of the method 300 may be understood to be a first virtual facility arrangement. In some embodiments, the method 600 is initially performed using the operations 310-330. In operation 610, the selection module 220 receives a second set of object placement selections. The second set of object placement selections represents a third arrangement of the first subset of user interaction objects and a third arrangement of the second subset of user interaction objects. For example, in operation 610, the facility generation entity may desire to modify an existing generated virtual facility to model changes to an existing physical facility or model rearrangement of products within a facility (e.g., a store or a house). In this respect, the facility generation entity may perform the second set of object placement selections to cause the virtual facility platform 150 to generate varying instances of the virtual facility.

In operation 620, the generation module 230 generates a second virtual facility arrangement based on the second set of object placement selections. The second virtual facility may be understood to be a modified version of the initial virtual facility comprising the set of user interaction objects arranged according to the third arrangements of the first subset of user interaction objects and the second subset of user interaction objects. The operation 620 may be performed similarly to the operation 340. In some example embodiments, the first virtual facility and the second virtual facility, complete with the respective arrangements of the set of user interaction objects, may be stored in a virtual facility repository. In some example embodiments, the virtual facility repository may comprise or be stored within a database (e.g., the database 126) and stored in one or more of the third party server 130 and the network-based publication system 142.

In some example embodiments, one or more virtual facility stored within the virtual facility repository may be made available for purchase, licensing, renting, or other transaction based availability to generate revenue for one or more of the facility generation entity or other user 106. For example, a corporation representing a chain of stores may generate a set of virtual facility models corresponding to common floor plans used for stores associated with the chain. The corporation may then enable individual managers or franchisees to purchase, license, or freely use the virtual facility models through the network-based publication system 142 or directly on a company managed virtual facility server. The managers or franchisees may perform the selections for the set of user interaction objects and the set of object placement selections to populate a virtual facility resembling a physical store location with which they are associated. In some instances, the managers or franchisees may store the generated virtual facilities in a database (e.g., the database 126) to be provided to the corporation or served to users 106.

Further, the managers or franchisees may enable electronic commerce through the generated virtual facility through publication of the generated virtual facility on the network-based publication system 142 or by linking the generated virtual facility to an inventory management system associated with one or more of the corporation or the physical store with which they are associated. In some embodiments, operators of the network-based publication system 142 may generate virtual facility models or completely generated virtual facilities for purchase, licensing, renting, or other transactions. Enabling users 106 to establish a virtual facility and store through the network-based publication system 142. In some instances, generated virtual facilities may be provided by the network-based publication system 142 to entertainment providers (e.g., video game companies, visual effects companies, or the like) for use for rendering three dimensional environments, product placement, environment testing, and the like.

In operation 630, the user module 240 receives a virtual facility selection. The virtual facility selection represents a selection among the first and second virtual facilities. Although discussed with respect to two virtual facilities, it should be understood that any number of virtual facilities and arrangements of user interaction objects may be generated for selection in the operation 630. In some example embodiments, as shown in FIG. 6, the virtual facility selection toggles from the first virtual facility arrangement to the second virtual facility arrangement. The operation 630 may be performed in response to a selection among the first virtual facility arrangement and the second virtual facility arrangement by a user 106 or a system making determinations on behalf of the user 106. For example, a user 106 may be presented with the first virtual facility and the second virtual facility. The user 106 may make a selection among the first and second virtual facilities, the selection being transmitted to and received by the user module 240.

In some embodiments, the user 106 does not make an active selection among the first and second virtual facilities. In these embodiments, the user module 240 may access a user profile associated with the user 106. The user module 240 may determine one or more preferences of the user 106 based on the user profile (e.g., a product preference, a shopping environment preference, a game environment preference, etc.). The determination of the one or more preferences may represent a virtual facility selection. For example, first virtual facility and the second virtual facility both represent the same store, the first virtual facility may be provided with a linear layout, the aisles aligned in a grid or lined pattern to present clearly organized objects and items. The second virtual facility may be provided with a non-linear layout (e.g., a circular orientation, a meandering orientation interweaving aisles, a maze, etc.), encouraging browsing and interaction with products or items proximate to one another and bearing varying degrees of relation. Where the user module 240 determines (e.g., through selection or through prior user behaviors indicated by the history data of the user) that the user 106 often engages in quickly locating and purchasing an item and terminating a shopping session, the user module 240 may receive a selection for the first virtual facility.

In operation 640, the presentation module 270 causes presentation of the second virtual facility arrangement and the set of user interaction objects. The operation 640 may be performed similarly to the operation 370. In some instances, the presentation of the second virtual facility arrangement may be performed in cooperation with the operations 350 and 360, to cause modification of the second virtual facility arrangement according to user data associated with the user 106 to whom the second virtual facility arrangement is being presented.

Figure 7:
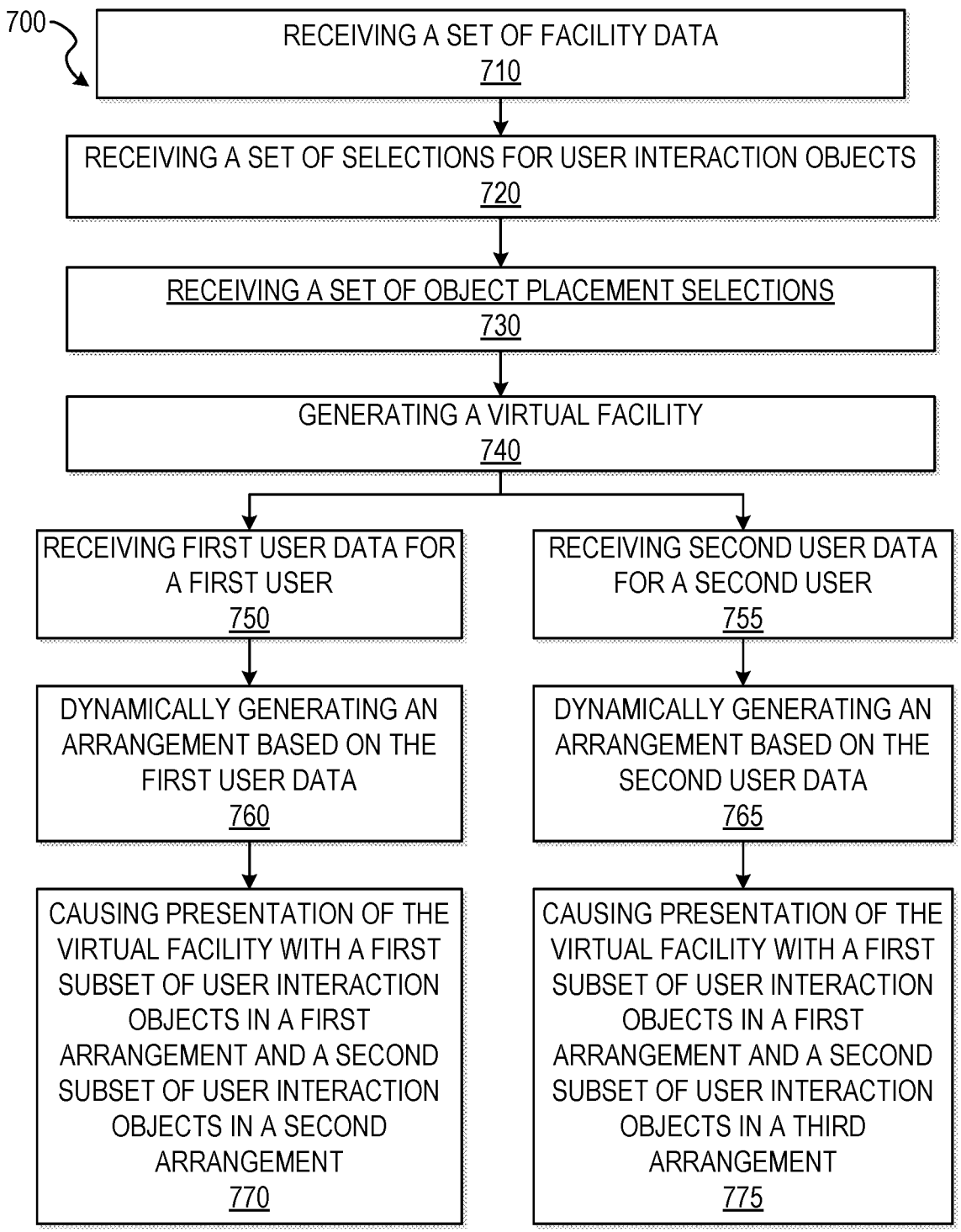
FIG. 7 is a flow diagram illustrating an example method, according to various embodiments.

FIG. 7 is a flow chart of operations of the virtual facility platform 150 in performing a method 700 of dynamically generating a virtual facility, according to some example embodiments. Operations in the method 700 may be performed by the virtual facility platform 150, using modules described above with respect to FIG. 2.

In operation 710, the receiver module 210 receives a set of facility data. The operation 710 may be performed similarly to the operation 310, with the receiver module 210 receiving the set of facility data via the network 104 in cooperation with the communication module 280. As discussed above, the set of facility data may comprise a set of selections from a facility template or facility element template, a set of facility measurements and image data, or combinations thereof.

In operation 720, the selection module 220 receives a set of selections for a set of user interaction objects. The operation 720 may be performed similarly to operation 320. For example, the selection module 220 may receive the set of selections for a set of user interaction objects via the network 104. In some embodiments, the set of selections may be in the form of packaged selections (e.g., a single selection selecting a plurality of user interaction objects) or individual selections. In some embodiments, an initial selection may prompt one or more subsequent selections configured to delineate a general or category selection to determine a specific object being selected from within a category. In some instances, the set of selections of the set of user interaction objects comprises receiving one or more of a measurement, an image, and a set of characteristics. In these embodiments, data received may be used to identify an appropriate user interaction object from a plurality of user interaction objects within an object repository, or may be used to generate a new user interaction object configured to represent a physical or non-physical item intended by the user 106.

In operation 730, the selection module 220 receives a set of object placement selections for the set of selected user interaction objects. In various example embodiments, the operation 730 is performed similarly or the same as operation 330. The set of object placement selections may be in the form of position selections (e.g., entering in a position by description, coordinate, or placement within the virtual facility), coordinate data, or any suitable selection or action performed to indicate a desired position, distribution, or arrangement of one or more of the set of user interaction objects within the virtual facility.

In operation 740, the generation module 230 generates a virtual facility and the set of user interaction objects distributed within the virtual facility, based on the set of object placement selections. The operation 740 may be performed similarly to the operation 340. The generation module 230 may generate the virtual facility and the set of interaction objects distributed within the virtual facility using the set of facility data, the set of object placement selections, and the set of user interaction objects. The generation module 230 may use two dimensional generation methods, three dimensional generation methods, combinations thereof, or any other suitable method to generate the virtual facility in a manner capable of being presented to the user 106 to allow the user 106 to traverse the virtual facility in a manner reminiscent of a physical facility.

In operation 750, the user module 240 receives first user data for a first user 106. In various example embodiments, the user module 240 receives the first user data at an initial interaction of the first user 106 with one or more of the network-based publication system 142 and the virtual facility platform 150. In some instances, the user module 240 receives the first user data while the first user 106 is interacting with the virtual facility and one or more of the objects of the first subset of the user interaction objects and the second subset of user interaction objects.

In operation 755, the user module 240 receives second user data for a second user 106. Similar to the first user 106, discussed above, in some embodiments, the user module 240 receives the second user data at an initial interaction of the second user 106 with one or more of the network-based publication system 142 and the virtual facility platform 150. In some instances, the user module 240 receives the second user data while the second user 106 is interacting with the virtual facility and one or more of the objects of the first subset of the user interaction objects and the second subset of user interaction objects.

In operation 760, the arrangement module 260 dynamically generates an arrangement of one or more user interaction objects of the set of user interaction objects based on the first user data. For example, as discussed above, the arrangement module 260 dynamically generates a second arrangement for the second subset of user interaction objects based on the first user data. The operation 760 may be performed similarly to operation 360. In various example embodiments, the second arrangement is unique to the first user 106 and the interaction session in which the first user 106 is engaged or in which the first user 106 is about to engage.

In operation 765, the arrangement module 260 dynamically generates an arrangement of one or more user interaction objects of the set of user interaction objects based on the second user data. For example, the arrangement module 260 dynamically generates a third arrangement for the second subset of user interaction objects based on the second user data. The operation 765 may be performed similarly to the operations 360 and 760. The third arrangement may be unique to the second user 106 based on the second user data, and may be unique for the interaction session in which the second user 106 is engaged or about to engage.

In operation 770, the presentation module 270 causes presentation of the virtual facility and the first subset of user interaction objects in the first arrangement and the second subset of user interaction objects in the second arrangement. The operation 770 may be performed similarly to operation 370.

In operation 775, the presentation module 270 causes presentation of the virtual facility and the first subset of user interaction objects in the first arrangement and the second subset of user interaction objects in the third arrangement. The operation 775 may be performed similarly to the operation 370 or operation 770.

In some example embodiments, the operations 770 and 775 may be performed for the first user 106 and the second user 106 accessing one or more of the network-based publication system 142 and the virtual facility platform 150 concurrently. Further, in some example embodiments, the first user 106 and the second user 106 may interact with the virtual facility and each other while being presented the set of user interaction objects in arrangements based on their own user data, without being presented arrangements of the user interaction elements based on the user data of the other user 106. In some instances, the operations 770 and 775 amount to presentation of a single virtual facility to each of the first user 106 and the second user 106, based on the respective first user data and second user data, where the first user 106 is isolated from the second user 106. For example, the same virtual facility, created for or by the facility generation entity (e.g., based on facility data and selections of the facility generation entity), may be presented in separate instantiations for each user 106 wishing to access the virtual facility.

Modules, Components, and Logic

Certain embodiments are described herein as including logic or a number of components, modules, or mechanisms. Modules may constitute either hardware-software modules (e.g., hardware components temporarily configured by code embodied on a non-transitory machine-readable storage medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application, an application portion, or processor executable instructions) as a hardware-software module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an application specific integrated circuit (ASIC). A hardware module may also include programmable logic or circuitry that is temporarily configured by software to perform certain operations. For example, a hardware-software module may include software executed by a programmable processor. Once configured by such software, hardware-software modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware-software module comprises a processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware-software module at one instance of time and to constitute a different hardware-software module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network 104 (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-7 are implemented in some embodiments in the context of a machine and an associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement described embodiments of the present disclosure in different contexts from the disclosure contained herein.

Software Architecture

Figure 8:
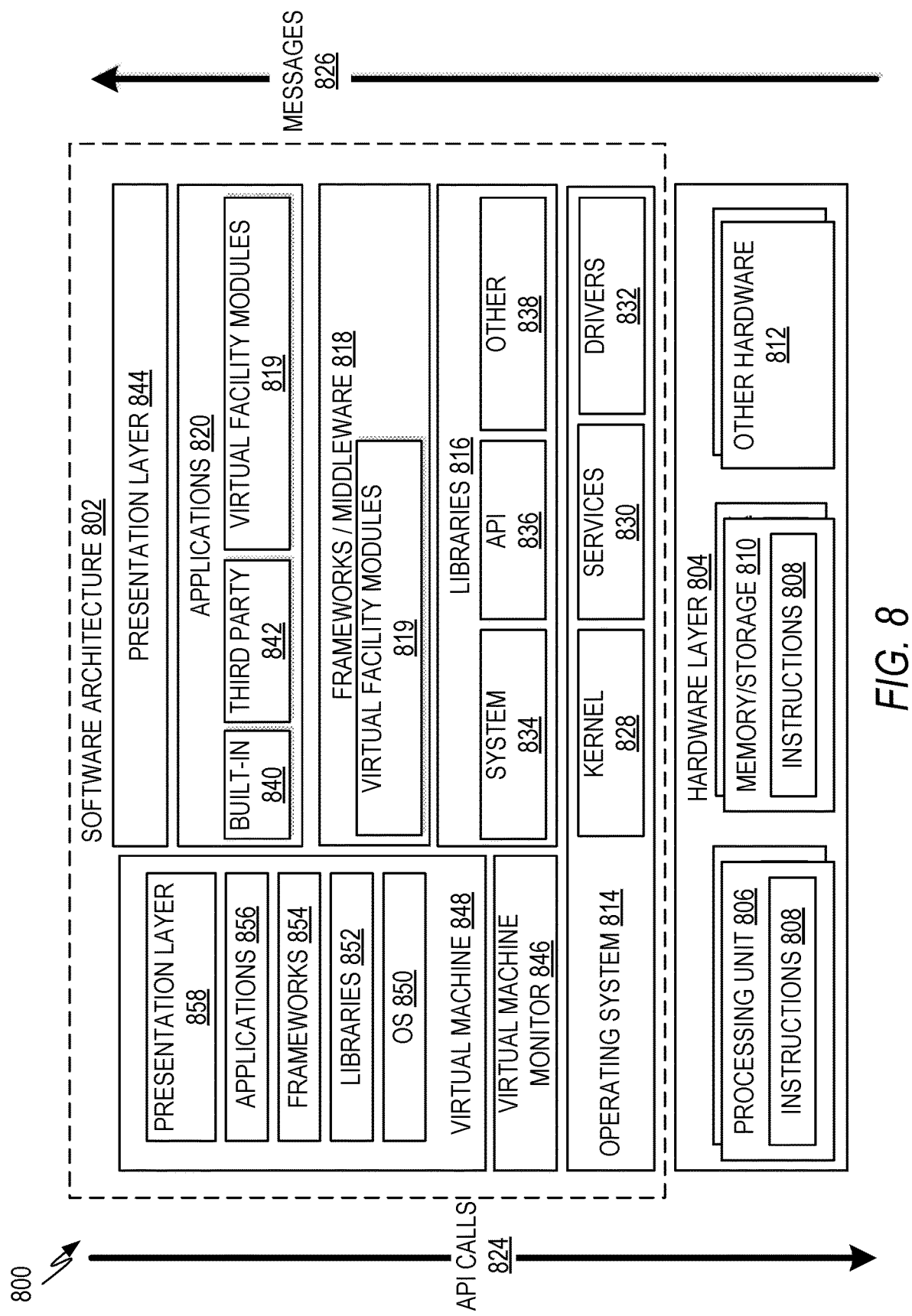
FIG. 8 is a block diagram illustrating an example of a software architecture that may be installed on a machine, according to some example embodiments.

FIG. 8 is a block diagram 800 illustrating a representative software architecture 802, which may be used in conjunction with various hardware architectures herein described. FIG. 8 is merely a non-limiting example of a software architecture and it will be appreciated that many other architectures may be implemented to facilitate the functionality described herein. The software architecture 802 may be executing on hardware such as machine 900 of FIG. 9 that includes, among other things, processors 910, memory 930, and I/O components 950. A representative hardware layer 804 is illustrated and can represent, for example, the machine 900 of FIG. 9. The representative hardware layer 804 comprises one or more processing units 806 having associated executable instructions 808. Executable instructions 808 represent the executable instructions of the software architecture 802, including implementation of the methods, modules and so forth of FIGS. 1-7. Hardware layer 804 also includes memory and/or storage modules 810, which also have executable instructions 808. Hardware layer 804 may also comprise other hardware as indicated by 812 which represents any other hardware of the hardware layer 804, such as the other hardware illustrated as part of machine 900.

In the example architecture of FIG. 8, the software 802 may be conceptualized as a stack of layers where each layer provides particular functionality. For example, the software 802 may include layers such as an operating system 814, libraries 816, frameworks/middleware 818, applications 820 and presentation layer 844. Operationally, the applications 820 and/or other components within the layers may invoke application programming interface (API) calls 824 through the software stack and receive a response, returned values, and so forth illustrated as messages 826 in response to the API calls 824. The layers illustrated are representative in nature and not all software architectures have all layers. For example, some mobile or special purpose operating systems may not provide a frameworks/middleware layer 818, while others may provide such a layer. Other software architectures may include additional or different layers.

The operating system 814 may manage hardware resources and provide common services. The operating system 814 may include, for example, a kernel 828, services 830, and drivers 832. The kernel 828 may act as an abstraction layer between the hardware and the other software layers. For example, the kernel 828 may be responsible for memory management, processor management (e.g., scheduling), component management, networking, security settings, and so on. The services 830 may provide other common services for the other software layers. The drivers 832 may be responsible for controlling or interfacing with the underlying hardware. For instance, the drivers 832 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 816 may provide a common infrastructure that may be utilized by the applications 820 and/or other components and/or layers. The libraries 816 typically provide functionality that allows other software modules to perform tasks in an easier fashion than to interface directly with the underlying operating system 814 functionality (e.g., kernel 828, services 830 and/or drivers 832). The libraries 816 may include system 834 libraries (e.g., C standard library) that may provide functions such as memory allocation functions, string manipulation functions, mathematic functions, and the like. In addition, the libraries 816 may include API libraries 836 such as media libraries (e.g., libraries to support presentation and manipulation of various media format such as MPEG4, H.264, MP3, AAC, AMR, JPG, PNG, graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 816 may also include a wide variety of other libraries 838 to provide many other APIs to the applications 820 and other software components/modules.

The frameworks 818 (also sometimes referred to as middleware) may provide a higher-level common infrastructure that may be utilized by the applications 820 and/or other software components/modules. For example, the frameworks 818 may provide various graphic user interface (GUI) functions, high-level resource management, high-level location services, and so forth. The frameworks 818 may provide a broad spectrum of other APIs that may be utilized by the applications 820 and/or other software components/modules, some of which may be specific to a particular operating system 814 or platform. In some example embodiments, virtual facility modules 819 (e.g., one or more modules of the virtual facility platform 150) may be implemented, at least in part, within the frameworks 818. For example, in some instances, at least a portion of the presentation module 270, providing graphic and non-graphic user interface functions, may be implemented in the frameworks 818. Similarly, in some example embodiments, portions of one or more of the receiver module 210, the generation module 230, the user module 240, the arrangement module 260, and the communication module 280 may be implemented in the frameworks 818.

The applications 820 include built-in applications 840 and/or third party applications 842. Examples of representative built-in applications 840 may include, but are not limited to, a contacts application, a browser application, a book reader application, a location application, a media application, a messaging application, and/or a game application. Third party applications 842 may include any of the built in applications as well as a broad assortment of other applications. In a specific example, the third party application 842 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 842 may invoke the API calls 824 provided by the mobile operating system such as operating system 814 to facilitate functionality described herein. In some instances, one or more virtual facility modules 819 may be implemented, at least in part, within the applications 820. For example, portions of the receiver module 210, the selection module 220, the user module 240, and the presentation module 270 may be implemented as a portion of an application 820.

The applications 820 may utilize built in operating system functions (e.g., kernel 828, services 830 and/or drivers 832), libraries (e.g., system 834, APIs 836, and other libraries 838), and frameworks/middleware 818 to create user interfaces to interact with users 106 of the system. Alternatively, or additionally, some systems interactions with a user 106 may occur through a presentation layer, such as presentation layer 844. In these systems, the application/module "logic" can be separated from the aspects of the application/module that interact with a user 106.

Some software architectures utilize virtual machines. In the example of FIG. 8, this is illustrated by virtual machine 848. A virtual machine 848 creates a software environment where applications/modules can execute as if they were executing on a hardware machine (such as the machine 900 of FIG. 9, for example). A virtual machine 848 is hosted by a host operating system (operating system 814 in FIG. 9) and typically, although not always, has a virtual machine monitor 846, which manages the operation of the virtual machine 848 as well as the interface with the host operating system (i.e., operating system 814). A software architecture executes within the virtual machine 848 such as an operating system 850, libraries 852, frameworks/middleware 854, applications 856 and/or presentation layer 858. These layers of software architecture executing within the virtual machine 848 can be the same as corresponding layers previously described or may be different.

Example Machine Architecture and Machine-Readable Medium

Figure 9:
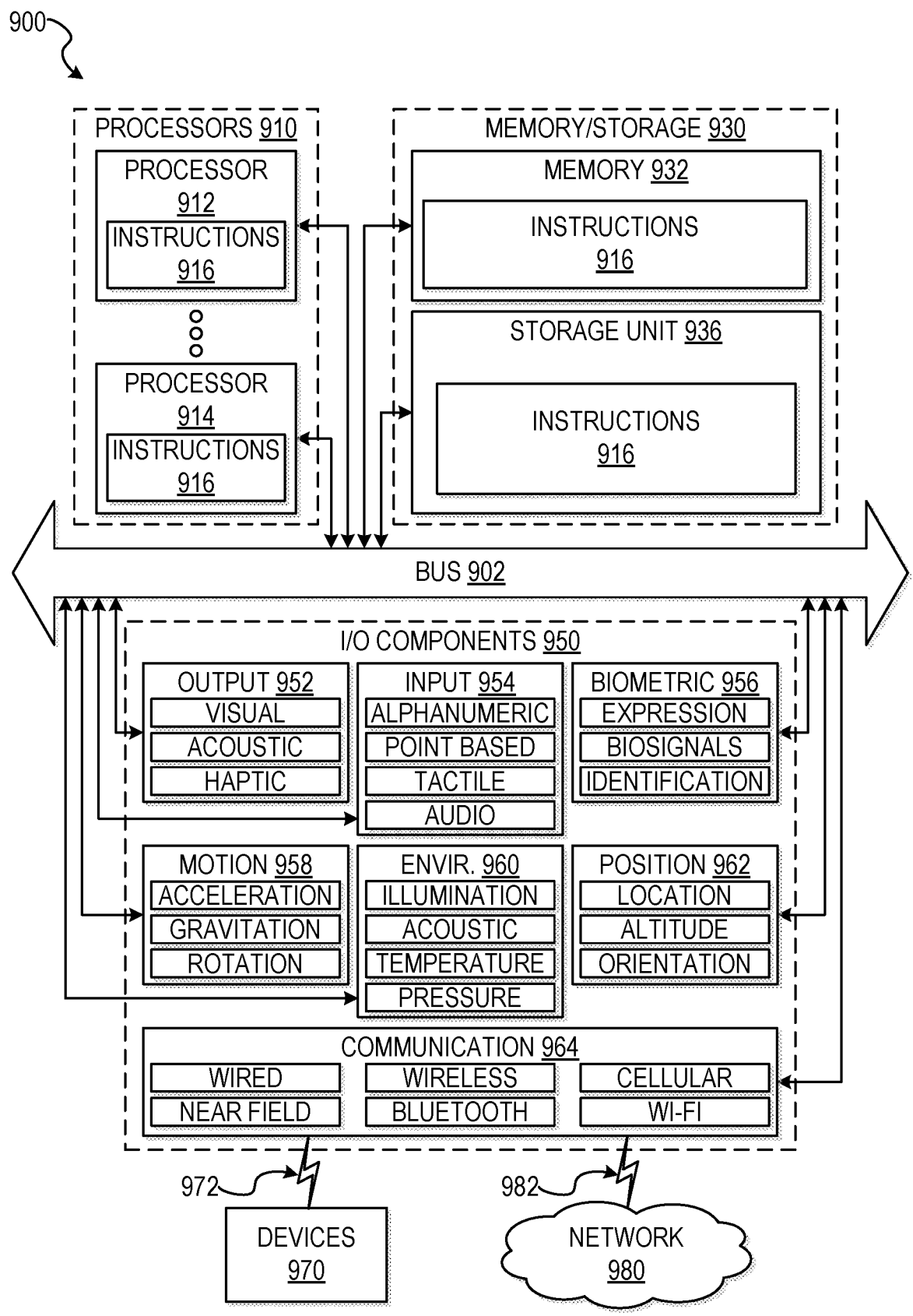
FIG. 9 illustrates a diagrammatic representation of a machine in the form of a computer system within which a set of instructions may be executed for causing the machine to perform any one or more of the methodologies discussed herein, according to an example embodiment.

FIG. 9 is a block diagram illustrating components of a machine 900, according to some example embodiments, able to read instructions 916 from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 916 (e.g., software, a program, an application 820, an applet, an app, or other executable code) for causing the machine 900 to perform any one or more of the methodologies discussed herein may be executed. For example the instructions 916 may cause the machine 900 to execute the flow diagrams of FIGS. 3-7. Additionally, or alternatively, the instructions 916 may implement the receiver module 210, the selection module 220, the generation module 230, the user module 240, the determination module 250, the arrangement module 260, the presentation module 270, and the communication module 280 of FIGS. 2-7, by temporarily or permanently configuring hardware components (e.g., one or more portions of the machine 900) to perform functions described above for the above-referenced modules. The instructions 916 transform the general, non-programmed machine 900 into a particular machine programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), an entertainment media system, a cellular telephone, a smart phone, a mobile device, a smart home device (e.g., a smart appliance), other smart devices, a web appliance, a network router, a network switch, a network bridge, or any machine capable of executing the instructions 916, sequentially or otherwise, that specify actions to be taken by machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which may be configured to communicate with each other such as via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, processor 912 and processor 914 that may execute instructions 916. The term "processor" is intended to include multi-core processor 910 that may comprise two or more independent processors 912, 914 (sometimes referred to as "cores") that may execute instructions 916 contemporaneously. Although FIG. 9 shows multiple processors 912, 914, the machine 900 may include a single processor 910 with a single core, a single processor 910 with multiple cores (e.g., a multi-core processor), multiple processors 912, 914 with a single core, multiple processors 912, 914 with multiples cores, or any combination thereof.

The memory/storage 930 may include a memory 932, such as a main memory, or other memory storage, and a storage unit 936, both accessible to the processors 910 such as via the bus 902. The storage unit 936 and memory 932 store the instructions 916 embodying any one or more of the methodologies or functions described herein. The instructions 916 may also reside, completely or partially, within the memory 932, within the storage unit 936, within at least one of the processors 910 (e.g., within the processor's cache memory), or any suitable combination thereof, during execution thereof by the machine 900. Accordingly, the memory 932, the storage unit 936, and the memory of processors 910 are examples of machine-readable media.

As used herein, "machine-readable medium" means a device able to store instructions 916 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" should be taken to include a single medium or multiple media (e.g., a centralized or distributed database 126, or associated caches and servers) able to store instructions 916. The term "machine-readable medium" shall also be taken to include any medium, or combination of multiple media, that is capable of storing instructions (e.g., instructions 916) for execution by a machine (e.g., machine 900), such that the instructions 916, when executed by one or more processors of the machine 900 (e.g., processors 910), cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 950 may include a wide variety of components to receive input, provide output, produce output, transmit information, exchange information, capture measurements, and so on. The specific I/O components 950 that are included in a particular machine 900 will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962 among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 962 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via coupling 982 and coupling 972 respectively. For example, the communication components 964 may include a network interface component or other suitable device to interface with the network 980. In further examples, communication components 964 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., a peripheral device coupled via a Universal Serial Bus (USB)).

Moreover, the communication components 964 may detect identifiers or include components operable to detect identifiers. For example, the communication components 964 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 964, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 980 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network and the coupling 982 may be a Code Division Multiple Access (CDMA) connection, a Global System for Mobile communications (GSM) connection, or other type of cellular or wireless coupling. In this example, the coupling 982 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., hypertext transfer protocol (HTTP)). Similarly, the instructions 916 may be transmitted or received using a transmission medium via the coupling 972 (e.g., a peer-to-peer coupling) to devices 970. The term "transmission medium" shall be taken to include any intangible medium that is capable of storing, encoding, or carrying instructions 916 for execution by the machine 900, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
   generating a virtual facility comprising a plurality of user interaction objects;
   receiving a selection from a user of a first user interaction object of the plurality of user interaction objects that is positioned at a first position in the virtual facility; and
   responsive to the selection of the first user interaction object that is positioned at the first position in the virtual facility:
      determining an object placement position that is proximate the first position in the virtual facility and within a distance threshold of the user in the virtual facility for a second user interaction object of the plurality of user interaction objects;
      dynamically positioning the second user interaction object at the determined object placement position; and
      causing presentation of the virtual facility with the dynamically positioned second user interaction object at the determined object placement position, wherein the receiving the selection, the determining the object placement position, the dynamically positioning, and the causing presentation of the virtual facility with the dynamically positioned second user interaction object occurs in real time during a single interaction session with the virtual facility.

2. The computer-implemented method of claim 1, further comprising detecting movement of the user through the virtual facility, and wherein the object placement position in the virtual facility is based at least in part on the detected movement of the user through the virtual facility.

3. The computer-implemented method of claim 1, wherein the object placement position is within a line of sight of the user in the virtual facility.

4. The computer-implemented method of claim 3, wherein positioning the second user interaction object within the line of sight of the user causes the second user interaction object to be displayed to the user in the virtual facility during a 360 degree turn.

5. The computer-implemented method of claim 1, wherein the dynamically positioning the second user interaction object causes the second user interaction object to replace a third user interaction object that was previously positioned at the determined object placement position in the virtual facility.

6. The computer-implemented method of claim 1, wherein the determined object placement position is outside of a current field of view of the user when the first user interaction object is selected.

7. The computer-implemented method of claim 6, further comprising displaying the second user interaction object at the determined object placement position within a new field of view of the user responsive to the user moving through the virtual facility.

8. The computer-implemented method of claim 1, wherein the selection of the first user interaction object corresponds to placing the first user interaction object into a shopping cart.

9. The computer-implemented method of claim 1, wherein the second user interaction object is selected based on a relationship between the second user interaction object and the first user interaction object.

10. The computer-implemented method of claim 9, wherein the relationship between the first user interaction object and the second user interaction object indicates that the second user interaction object is commonly purchased with the first user interaction object.

11. The computer-implemented method of claim 1, wherein the causing presentation of the virtual facility with the dynamically positioned second user interaction object at the determined object placement position occurs responsive to the selection of the first user interaction object that is positioned at the first position in the virtual facility and before any subsequent user action is received.

12. The computer-implemented method of claim 1, wherein the causing presentation of the virtual facility with the dynamically positioned second user interaction object at the determined object placement position occurs responsive to and immediately following the selection of the first user interaction object that is positioned at the first position in the virtual facility, and wherein the selection comprises a selection by the user to place the first user interaction object in a virtual shopping cart.

13. The computer-implemented method of claim 1, wherein the selection of the first interactive object occurs within a section of the virtual facility that includes user interaction objects that are similar to the first user interaction object, and wherein the determined object placement position is within the section of the virtual facility that includes the user interaction objects that are similar to the first user interaction object.

14. A system, comprising:
- at least a memory and a processor to perform operations comprising:
  - generating a virtual facility comprising a plurality of user interaction objects;
  - receiving a selection from a user of a first user interaction object of the plurality of user interaction objects that is positioned at a first position in the virtual facility; and
  - responsive to the selection of the first user interaction object that is positioned at the first position in the virtual facility:
    - determining an object placement position that is proximate the first position in the virtual facility and within a distance threshold of the user in the virtual facility for a second user interaction object of the plurality of user interaction objects;
    - dynamically positioning the second user interaction object at the determined object placement position; and
    - causing presentation of the virtual facility with the dynamically positioned second user interaction object at the determined object placement position, wherein the receiving the selection, the determining the object placement position, the dynamically positioning, and the causing presentation of the virtual facility with the dynamically positioned second user interaction object occurs in real time during a single interaction session with the virtual facility.

15. The system of claim 14, wherein the operations further comprise detecting movement of the user through the virtual facility, and wherein the object placement position in the virtual facility is based at least in part on the detected movement of the user through the virtual facility.

16. The system of claim 14, wherein the object placement position is within a line of sight of the user in the virtual facility.

17. The system of claim 14, wherein the second user interaction object is selected based on a relationship between the second user interaction object and the first user interaction object.

18. The system of claim 17, wherein the relationship between the first user interaction object and the second user interaction object indicates that the second user interaction object is a component of the first user interaction object.

19. The system of claim 14, wherein the dynamically positioning the second user interaction object causes the second user interaction object to replace a third user interaction object that was previously positioned at the determined object placement position in the virtual facility.

20. One or more non-transitory machine-readable media comprising instructions stored thereon that, responsive to execution by one or more processors of a computing device, perform operations comprising:
- generating a virtual facility comprising a plurality of user interaction objects;
- receiving a selection from a user of a first user interaction object of the plurality of user interaction objects that is positioned at a first position in the virtual facility; and
- responsive to the selection of the first user interaction object that is positioned at the first position in the virtual facility:
  - determining an object placement position that is proximate the first position in the virtual facility and within a distance threshold of the user in the virtual facility for a second user interaction object of the plurality of user interaction objects; and
  - dynamically positioning the second user interaction object at the determined object placement position, wherein the receiving the selection, the determining the object placement position, and the dynamically positioning occurs in real time during a single interaction session with the virtual facility.

* * * * *